United States Patent
Johnson et al.

(10) Patent No.: US 10,010,793 B2
(45) Date of Patent: Jul. 3, 2018

(54) TECHNIQUES FOR IMPROVED USER INTERFACE HELPING SUPER GUIDES

(75) Inventors: Jonathan Johnson, Bellevue, WA (US); Yukimi Shimura, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 341 days.

(21) Appl. No.: 13/159,826

(22) Filed: Jun. 14, 2011

(65) Prior Publication Data
US 2012/0021840 A1   Jan. 26, 2012

Related U.S. Application Data

(60) Provisional application No. 61/344,221, filed on Jun. 14, 2010.

(51) Int. Cl.
*A63F 13/00*   (2014.01)
*A63F 13/5375*   (2014.01)
(Continued)

(52) U.S. Cl.
CPC .......... *A63F 13/5375* (2014.09); *A63F 13/49* (2014.09); *A63F 13/60* (2014.09);
(Continued)

(58) Field of Classification Search
CPC ...... A63F 13/00; A63F 13/5375; A63F 13/49; A63F 13/60; A63F 13/2145; A63F 13/26;
(Continued)

(56) References Cited

U.S. PATENT DOCUMENTS

| | | | |
|---|---|---|---|
| 6,764,401 B1 * | 7/2004 | Akatsuka | A63F 13/10 463/36 |
| 2002/0109668 A1 * | 8/2002 | Rosenberg | G05G 9/047 345/156 |

(Continued)

OTHER PUBLICATIONS

New Super Mario Bros. Wii Game Manual. Released Nov. 11, 2009. http://www.nintendo.com/consumer/gameslist/manuals/Wii_NSMBW.pdf. Last Accessed Sep. 29, 2012.*

(Continued)

*Primary Examiner* — Tramar Harper
*Assistant Examiner* — Jeffrey Wong
(74) *Attorney, Agent, or Firm* — Nixon & Vanderhye PC

(57) ABSTRACT

User interface approaches to providing help to players by playing back previously recorded inputs. Certain exemplary embodiments involve displaying, with the recorded playback, an input device icon to show where the inputs are occurring and/or where the inputs should occur if the player were to make them. Modifications are made to the previously recorded input to improve the user's ability to see what is happening, as well as making the playback seem more consistent, mechanical, and automatic. The help makes the computer application seem like the user interface is operating itself in a way that is easy to follow, rather than giving the impression that a previously recorded user input stream simply is being played back in accordance with the more organic and potentially idiosyncratic behaviors of the recorded person. The modifications may in certain exemplary embodiments include, for example, path smoothing/correction, automatic snapping, delay periods, speed normalization, etc.

36 Claims, 21 Drawing Sheets

(51) Int. Cl.
*A63F 13/49* (2014.01)
*A63F 13/60* (2014.01)
A63F 13/26 (2014.01)
A63F 13/2145 (2014.01)

(52) U.S. Cl.
CPC ........... *A63F 13/2145* (2014.09); *A63F 13/26* (2014.09); *A63F 2300/1075* (2013.01); *A63F 2300/305* (2013.01); *A63F 2300/634* (2013.01)

(58) Field of Classification Search
CPC ........ A63F 2300/1075; A63F 2300/305; A63F 2300/634
USPC .......................................................... 463/43
See application file for complete search history.

(56) References Cited

U.S. PATENT DOCUMENTS

| | | | | |
|---|---|---|---|---|
| 2004/0087363 | A1* | 5/2004 | Bogenn | A63F 13/10 463/29 |
| 2005/0246638 | A1* | 11/2005 | Whitten | 715/708 |
| 2006/0094502 | A1* | 5/2006 | Katayama | A63F 13/10 463/31 |
| 2008/0119286 | A1* | 5/2008 | Brunstetter | A63F 13/00 463/43 |
| 2011/0025614 | A1* | 2/2011 | Ohta | A63F 13/06 345/173 |
| 2011/0306395 | A1* | 12/2011 | Ivory et al. | 463/1 |

OTHER PUBLICATIONS

CGRundertow Get Up and Dance for PlayStation 3 Video Game Review Uploaded by CGRundertow Dec. 15, 2011 https://www.youtube.com/watch?v=hF4QTvLq84E.*
Kirby: Canvas Curse Review on Gamespot by Jeff Gerstmann Jun. 13, 2005 http://www.gamespot.com/reviews/kirby-canvas-curse-review/1900-6127444/.*
Get Up and Dance Q&A by Akhil Malhortra Oct. 19, 2011 http://gamevolution.co.uk/2011/10/get-up-and-dance-qa-2/.*
Let's play Kirby Canvas Curse pt 1—Tutorial Uploaded by JoxiahWolfblade Sep. 12, 2012 https://www.youtube.com/watch?v=82J6cVfXWDc.*
Just Dance Review Written by Tom Orry Created on Jan. 21, 2010 https://www.videogamer.com/reviews/just-dance-review.*
Just Dance Review (Wii) Uploaded by—wiiviewr Uploaded on Mar. 26, 2010. https://www.youtube.com/watch?v=-xvj9hJpvi0.*

* cited by examiner

TECHNIQUES FOR IMPROVED USER INTERFACE HELPING SUPER GUIDES

CROSS-REFERENCE TO RELATED APPLICATION

This application claims the benefit of U.S. Application Ser. No. 61/344,221, filed on Jun. 14, 2010, the entire contents of which are hereby incorporated herein by reference.

TECHNICAL FIELD

Certain exemplary embodiments described herein relate to computer device user interface approaches to providing help to users navigating complex interactive sequences. More particularly, certain exemplary embodiments involve displaying, with the recorded simulated real-time user input, an input device icon to show where the inputs are occurring and/or where the inputs should occur if the player were to make them, wherein modifications are made to the previously recorded input to improve the user's ability to see what is happening, as well as making the playback seem more mechanical and automatic. This type of help advantageously makes the user interface seem like it is playing itself in a way that is easy to follow, rather than giving the impression that a previously recorded video simply is being played back in accordance with the more organic and potentially idiosyncratic behaviors of the recorded person.

BACKGROUND AND SUMMARY

The human-machine interface is an important aspect of any interactive computing system. It is what allows a human user to control the system to perform useful tasks. The better the interface, the more deficient and effective the control and interaction.

Unfortunately, many user interfaces are exceedingly complex. Some are so complex that they require the user to read an entire book or take a training course. But requiring a user to read a book to learn how to interact with a computing application is a burden. Nevertheless, the increasing complexity, flexibility, and functionality of applications such as word processors, video and graphics editing software, financial analysis programs, and the like, have placed a premium on efficiently teaching users how to use the interface.

For example, video and computer game systems typically are configured to enable a player to play a number of different types of games such as, for example, puzzle games, strategy games, action games, etc. In video and computer game systems, there often are tensions between providing more challenging game play for experienced players, and attracting and providing enjoyable game experience for less experienced users. The latter group may be frustrated by, for example, complex game environments, user interfaces, and the like, that experienced users find challenging and enjoyable. Of course, even experienced players sometimes encounter difficulty playing certain games. For example, players who like puzzle and strategy games may have a hard time playing action games, and vice versa. Some puzzle games are harder than other puzzle games, e.g., because of the skill needed, the challenges involved, the time required, etc. Similar observations apply with respect to different types of games and/or applications, as well.

As a result of these and/or other difficulties, some players consult user or strategy guides. Such guides may come in book or magazine form. Other guides may be provided, for example, in online forums, on webpages, etc. Although useful guidance may be provided, a user consulting a guide that is external to the application may be taken away from the computing environment for some period of time. Having to frequently consult an external guide ultimately may have a negative impact on the user who might be inclined to think that the software is re simply too hard, not worth the time, etc.

To help address this situation, Nintendo developed and provided in games such as Super Mario for the Wii an in-game "Super Guide" helper system. A Super Guide typically is an in-game approach to providing help to a player who requests it. One way a Super Guide can work is by playing back previously recorded or simulated inputs of a designer, developer, or other person. Recorded input data may be stored (e.g., on a game ROM or disk) for playback as a Super Guide during the game, e.g., at the request of the user. In a way, the playback of the previously recorded inputs using the Super Guide is a form of automatic game play such that the game seems like it is playing itself. The playback of the previously recorded inputs can show a part of the solution to the player as if the designer, developer, or other person were playing the game. Such techniques have proven to be advantageous in terms of providing a player-selectable balance between allowing that player to "wrestle" with the game to a desired extent, and providing easy access to a solution while in the game environment.

Although Super Guide techniques are advantageous for at least the above-noted reasons, further improvements are still possible. As noted above, for example, some Super Guides work by recording and playing human input. As a result, the playback of the recorded data is subject to errors, deviations, abnormalities, randomness encountered during the initial recording, etc. Thus, even though designers, developers, and the sort often know generally how to accomplish a particular task, defeat an enemy, pass a level, etc., there sometimes are problems with the actual implementation of these ideas when actually playing through a game or portion of a game.

As a potentially more concrete example, a stylus or other pointing input device often is used to provide inputs. The use of the stylus or other handheld pointing device is subject to a large amount of human-specific action. These organic, human-specific actions are natural in actual game play but may not be appropriate for a Super Guide—like the difference between driving a sports car through hairpin turns and sitting in the passenger seat. Indeed, organic, jittery movements can often be recorded. This may be a function of, for example, hand shaking, lack of resolution on input interface (e.g., a touch screen), unnecessary little movements or corrected macro-movements, etc. Ultimately, the organic nature of the recorded input that is played back tends to distract the user from the solution being provided. Furthermore, because different people have different game play styles, the recorded data may not be consistent when multiple people are providing the inputs and/or as a result of other seeming randomness—even when one party provides all inputs. Similarly, a designer's style and skill may not be consistent with the normal level of skill of the gamer, as it may be too fast, too slow, unclear, etc. It will be appreciated that jittery, inconsistent Super Guide playbacks caused by the above-described and/or other phenomena may be distracting and ultimate may cause a player to have a negative impact—even though the Super Guide is supposed to make the game more enjoyable and easier to play.

In view of the foregoing, it will be appreciated that a more mechanical and automatic and less organic looking Super Guide would be desirable, at least from a user-perspective.

One aspect of certain exemplary embodiments relates to displaying, along with the recorded playback, an icon of the input device (e.g., pointer device such as stylus, pen, Wii remote, etc.) on the screen to show where the inputs are occurring in the playback and/or where the inputs should occur if the player were to make them in the game.

Another aspect of certain exemplary embodiments relates to making modifications to the previously recorded input to improve the user's ability to see what is happening, as well as making the playback seem more mechanical and less automatic. Such modifications may include, for example, path smoothing, path correction, automatic snapping, delay periods, speed normalization, and/or the like.

Still another aspect of certain exemplary embodiments relates to a Super Guide that reduces the visual appearance of the organic actions and potentially idiosyncratic behaviors of the person being recorded.

In certain exemplary embodiments, a non-transitory computer readable storage medium tangibly storing instructions that are executable by a processor is provided. The instructions are executable so as to at least enable a user to play a game by running a game program; receive a request for help from the user from within the game program; determine a current state of the game program; determine a next appropriate action for the user based on the current state and the request for help; and cause an annotated display of modified pre-recorded input or series of inputs, selected from a catalog of pre-recorded inputs and/or series of inputs, based on the next appropriate action for the user, to guide the user in accordance with the request for help.

In certain exemplary embodiments, a method of guiding a user of an application program running on a computer system is provided. The user is enabled to use the application program on the computer system. A request for help is received from the user from within the application program. An appropriate next action or next series of actions is determined, via a processor of the computer system, based on the request for help. A visual demonstration is provided to the user regarding how to take the appropriate next action or next series of actions by playing back modified pre-provided input or series of inputs to simulate the appropriate next action or next series of actions to be taken.

According to certain exemplary embodiments, a current state of the application program may be determined and considered in the determining of the appropriate next action or next series of actions, and/or the appropriate next action or next series of actions to be taken may be simulated using one or more visual cues demonstrating how the user is to use a physical input device in connection with a user interface of the application program.

In certain exemplary embodiments, there is provided a computerized system comprising a memory and a processor configured to execute a game program thereon. The game program is programmed to: receive a request for help from the user; determine, via the processor, an appropriate next action or next series of actions based on the request for help; and cause a visual suggestion to be displayed to the user regarding how to use one or more physical input mediums to supply to the game program the appropriate next action or next series of actions, with the visual suggestion including the playing back of annotated versions of modified pre-provided input or series of inputs corresponding to the appropriate next action or next series of actions.

According to certain exemplary embodiments, the modified pre-provided input or series of inputs involve one or more of: a prolongation of at least a portion of the pre-provided input or series of inputs so that the corresponding simulation is visible for at least a predetermined amount of time; a smoothing and/or filtering of at least a portion of the pre-provided input or series of inputs so that the corresponding simulation lacks jitters that otherwise would be present therein if the pre-provided input or series of inputs were reproduced; a removal of at least a portion of the pre-provided input or series of inputs so that the corresponding simulation proceeds more directly from a start point to an end point that otherwise would be present if the pre-provided input or series of inputs were reproduced; a normalization of at least a portion of the pre-provided input or series of inputs so that the corresponding simulation proceeds at either a predetermined pace and/or within a predetermined amount of time; an adjustment of a line so as to snap the line to a grid having cells that are one or more pixels in each dimension such that a straighter line and/or segment of line is/are provided; and/or other modifications.

Modifications to the pre-recorded input or series of inputs may be processed and stored ahead of time so that annotated displays are retrievable from a storage location in certain exemplary embodiments, whereas modifications to the pre-recorded input or series of inputs are processed upon requests for help in other exemplary embodiments. Thus, according to certain exemplary embodiments, a non-transitory storage location may tangibly store the annotated version of the modified pre-provided input or series of inputs, whereas annotations and/or modifications to pre-provided input or series of inputs may be processed and stored in the storage location ahead of time so that annotated displays are retrievable during game program execution by the user in other exemplary embodiments. In either or both cases, the game program may programmed to modify the pre-provided input or series of inputs are processed at runtime.

A game or other application program may be at least temporarily paused during the annotated display of modified pre-recorded input or series of inputs according to certain exemplary embodiments.

According to certain exemplary embodiments, the game program may be output to a first display device and the annotated display may be output to a second display device. for instance, a system may also comprise a console gaming system, a first display device connected to the console gaming system on which a common screen of the game program is displayable, and a plurality of input devices, each said input device being usable by a different user and including a second display device on which an individualized user screen of the game program is displayable. In some cases, a visual suggestion may be displayable only on a second display device of the user requesting help.

In certain exemplary embodiments, a method of developing a guide for an application program is provided. User inputs are captured at a predetermined rate. Captured user inputs are associated with actions or events in the application program. Modification data corresponding to how the captured user inputs are to be modified is generated, via at least one processor, so that, when reproduced, the user inputs appear more mechanical than the captured user inputs. The user inputs are reproducible on a display in modified form based on the modification data.

In certain exemplary embodiments, a non-transitory computer readable storage medium tangibly storing instructions that are executable by a processor is provided to capture user inputs to an application program at a predetermined rate; associate captured user inputs with actions or events in the application program; and generate modification data corresponding to how the captured user inputs are to be modified so that, when reproduced, the user inputs appear more mechanical than the captured user inputs. The user inputs are reproducible on a display in modified form based on the modification data.

In certain exemplary embodiments, a system for developing a guide for an application program includes a processor and a memory. A recording module is configured to capture user inputs at a predetermined rate. A recording sequencer is configured to associate captured user inputs with actions or events in the application program. An annotator is configured to generate modification data corresponding to how the captured user inputs are to be modified so that, when reproduced, the user inputs appear more mechanical than the captured user inputs. The recording module, the recording sequencer, and the annotator are all under control of the processor. The user inputs are reproducible on a display in modified form based on the modification data.

It will be appreciated that these aspects and embodiments may be combined in various combinations and sub-combinations to achieve yet further exemplary embodiments. Also, it will be appreciated that the exemplary embodiments herein may be implemented as any suitable combination of programmed logic circuitry including, for example, hardware, software, firmware, etc. Instructions may be tangibly stored on a non-transitory computer readable storage medium in certain exemplary embodiments.

BRIEF DESCRIPTION OF THE DRAWINGS

These and other features and advantages will be better and more completely understood by referring to the following detailed of exemplary illustrative non-limiting implementations in conjunction with the drawings, of which.

DETAILED DESCRIPTION

Certain exemplary embodiments relate to Super Guides, which generally involve in-game approaches to providing help to players. As indicated above, a Super Guide can work by playing back previously recorded inputs of a designer, developer, or other person, e.g., at the request of the user. In a way, the playback of the previously recorded inputs using the Super Guide is a form of automatic game play such that the game seems like it is playing itself. Certain exemplary embodiments improve upon Super Guides by displaying, along with the recorded playback, an icon of the input device (e.g., pointer device such as stylus, pen, cursor, Wii remote, etc.) on the screen to show where the inputs are occurring in the playback and/or where the inputs should occur if the player were to make them in the game. Modifications are made to the previously recorded input to improve the user's ability to see what is happening, as well as making the playback seem more consistent, mechanical and less automatic. In this way, the game seems more like it is playing itself in a way that potentially is easier to follow, rather than giving the impression that a previously recorded input stream is simply being played back in accordance with the more organic and potentially idiosyncratic behaviors of the person being recorded. The modifications may in certain exemplary embodiments include, for example, path smoothing, path correction, automatic snapping, delay periods, speed normalization, and/or the like.

Figure 1:
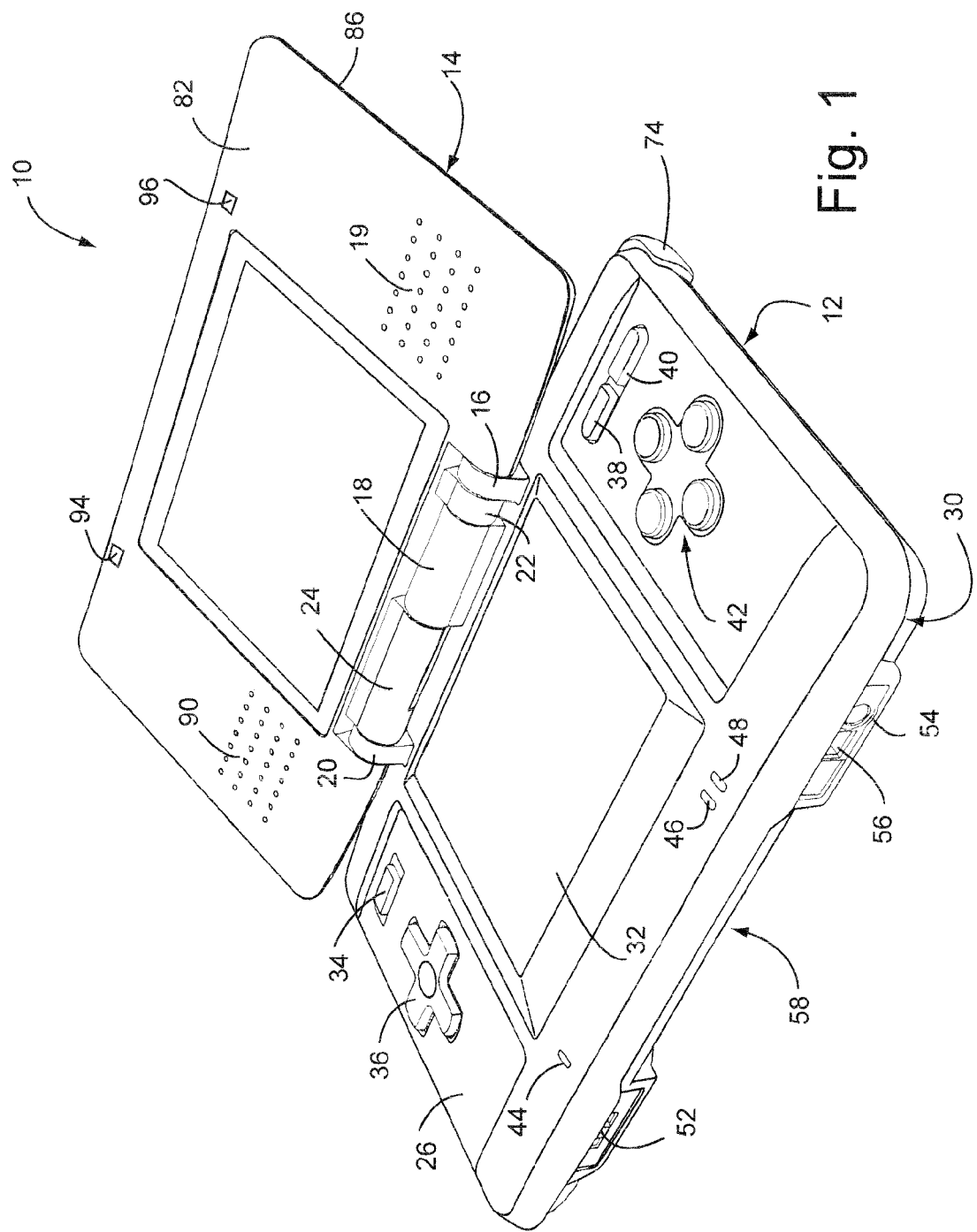
FIG. 1 is a perspective view of the electronic game and communications device in accordance with an exemplary embodiment of the invention, with the device shown in an open, ready-to-use orientation.
Figure 2:
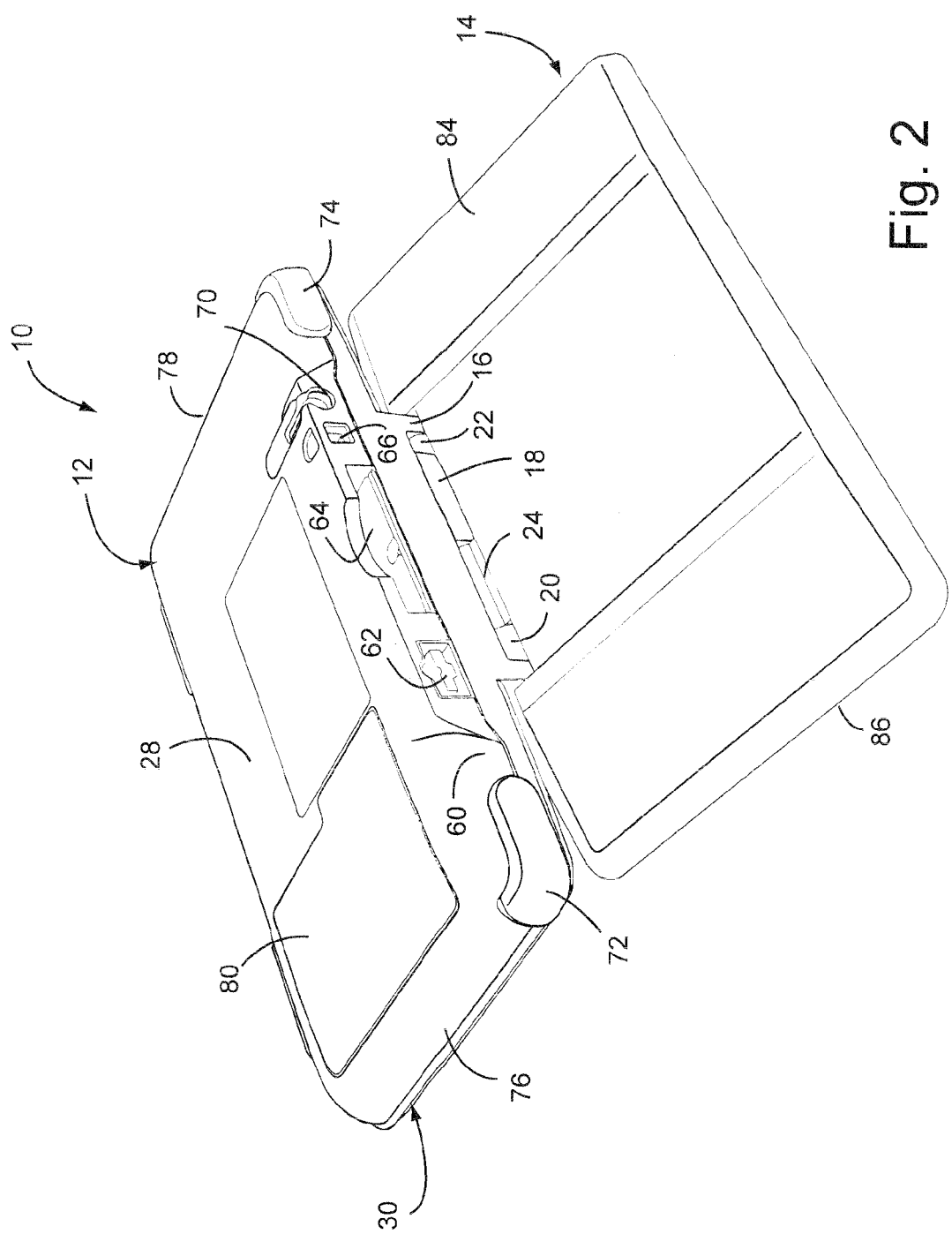
FIG. 2 is a inverted perspective view of the game device shown in FIG. 1.

An illustrative video game system with which the improved Super Guide may be used will now be described in connection with FIGS. 1-13. Referring first to FIGS. 1 and 2, in an illustrative embodiment the game device or console 10 includes a main body 12 and a cover body 14 hingedly connected to each other along an upper edge of the main body 12 and a lower edge of the cover body 14 (references herein to terms such as "upper" and "lower" and "forward" and "rearward" are for ease of understanding and are made relative to an orientation of the game device where the cover body 14 is in an open position and the game is being held by a user in a normal operating position). Hinge elements 16, 18, and 20 on the main body 12 mesh with hinge elements 22 and 24 on the cover body, with a hinge pin (not shown) extending through the aligned hinge elements in conventional fashion. Note that because hinge elements 16, 18, and 20 extend from the upper (or inner) face 26 of the main body 12, the cover body 14 overlies the upper face 26 when the cover body 14 is closed over the main body. When the cover body 14 is in its fully open position, it is substantially parallel to the main body 12 but lies in a substantially parallel, offset plane. The main body 12 also has a lower (or outer) face 28 (FIG. 2) and a peripheral edge 30.

A first display screen 32 is recessed within the upper face 26 of the main body 12 with dimensions of approximately 2½ inches in length and 1⅞ inches in width, yielding a diagonal screen dimension of 3 inches. The screen in the exemplary embodiment is a backlit, color liquid crystal display (LCD). This screen is touch sensitive and may be activated by a stylus, described further herein. A power button 34 is located in the upper left corner of face 26 and is used to turn the game on and off. A cross-shaped directional control button 36 is located adjacent and below the power button 34, and is used for game play control.

In the upper right corner of the main body 12, there are side-by-side "start" and "select" buttons 38, 40, respectively, with X/Y/A/B buttons 42 located adjacent and below the "start" and "select" buttons. Buttons 38, 40, and 42 are also used for game play control. A microphone 44 is located below the left edge of screen 32 for use with specially designed games having a microphone feature. A battery recharge indicator LED 46 and a power indicator LED 48 are also located on the upper face 26, adjacent the lower edge thereof, below the right edge of screen 32.

Figure 3:
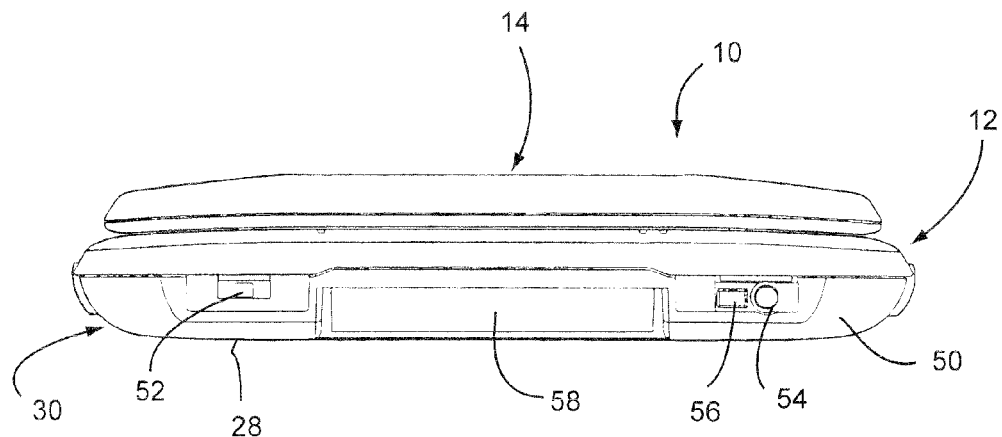
FIG. 3 is a front elevation of the device shown in FIG. 1, but with the game shown in a closed position.
Figure 4:
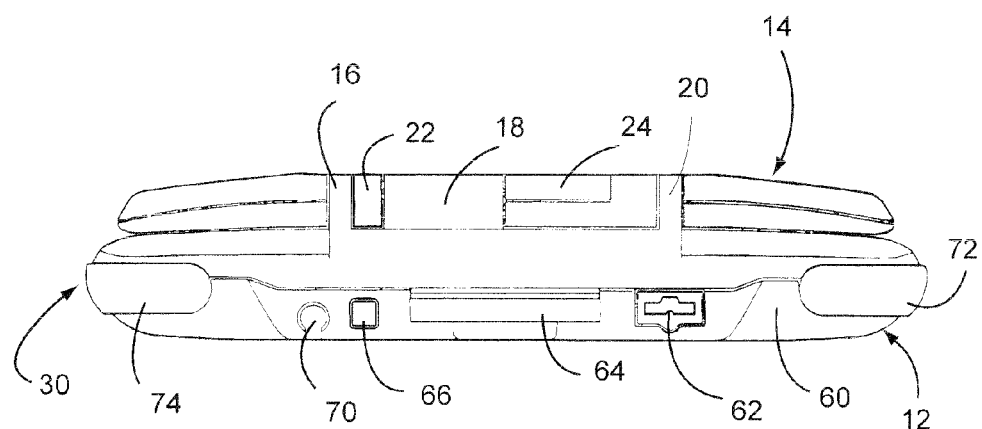
FIG. 4 is a rear elevation of the device shown in FIG. 3.
Figure 5:
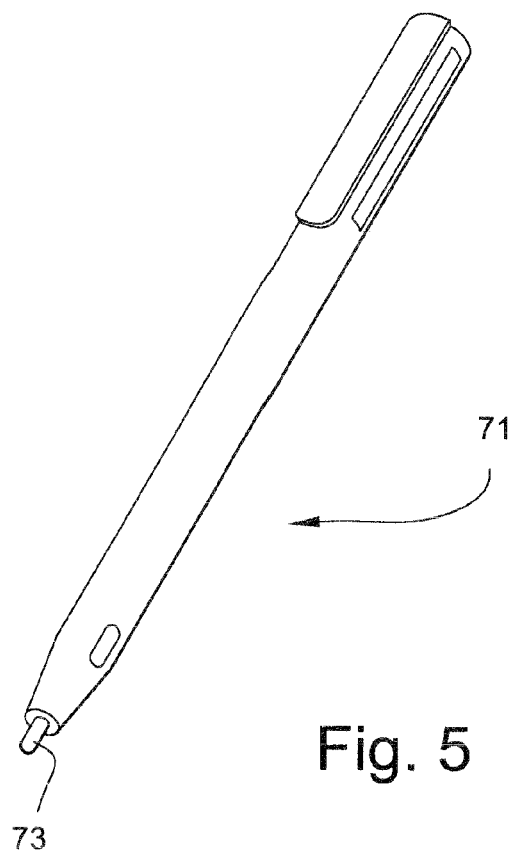
FIG. 5 is a perspective view of a stylus for use with the game device shown in FIGS. 1-4.

With reference now especially to FIG. 3, a lower or forward portion 50 of the peripheral edge 30 (closest to the user) is provided with a volume control slide 52 and headphone and microphone connectors 54, 56 on either side of a first game slot 58. Slot 58 is especially designed for larger game cartridges or cards originally designed for use with the assignee's Game Boy Advance® game system.

As perhaps best seen in FIG. 2, an upper or rearward portion 60 of the peripheral edge 30 is provided with an external extension connector 62 that permits connection to an AC adapter for recharging the internal battery (not shown), or for operating the game using household power. A second game slot 64 in edge portion 60 is designed for receiving memory or game cards especially designed for this game device. The second game slot 64 is smaller than the first game slot 58, reflecting the different sizes of the game cards. Openings 66, 68 form an elbow-shaped through slot adapted for securing a wrist strap (not shown), thereby enabling the user to secure the game device to the body and thus minimize the potential for losing or misplacing the game. A stylus port or holder, in the form of a blind bore 70 is located adjacent the wrist-strap mount for holding a stylus 71 (FIG. 5) before or after use.

The stylus 71 is a plastic pencil-shaped device with a rounded tip 73 and is used to activate the touch screen 32.

A pair of left, right control buttons (or shoulder buttons) 72, 74 are located on the peripheral edge 30, at the corners where the upper portion 60 of the peripheral edge 30 meets the side portions 76, 78 of the peripheral edge. The location of these buttons and the location of previously described buttons 34, 36 and 42 facilitate manipulation game control by the user's thumbs and index fingers when the game is held with two hands in a natural and intuitive manner.

The lower (or outer) face 28 of the main body is provided with a battery cover 80 (FIG. 2) for accessing a rechargeable battery pack located within the main body.

The cover body 14 also has an upper (or inner) face 82 (FIG. 1) and a lower (or outer) face 84 (FIG. 2) connected by a peripheral edge 86. The upper face 60 incorporates a second display screen 88 of substantially the same dimensions as screen 32. Screen 88 is also a backlit color LCD. The cover body 14 also incorporates a pair of stereo speakers, with speaker grills 90, 92 located on opposite sides of the screen 88. Dimples or pads 94, 96 may be located above and laterally of screen 88. The dimples may be made of a compressible polymer or other suitable material and serve to dampen engagement of the inner surface 82 of the cover body 14 with the inner surface 26 of the main body 12 when the cover body is closed over the main body.

As already noted, the game card slot 58 is sized and adapted to receive a conventional game card designed for the by now well known Nintendo Gameboy Advance System®. Accordingly, the game card per se for slot 58 need not be described further.

Figure 6:
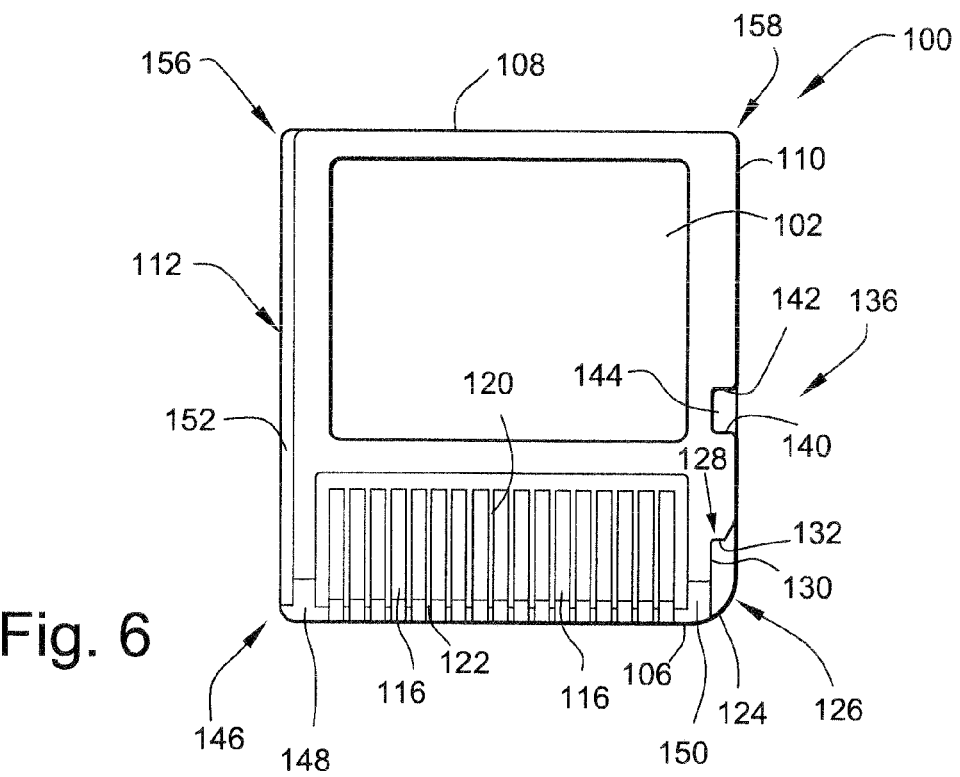
FIG. 6 is a plan view of a game card for use with the game device shown in FIGS. 1-4.
Figure 7:
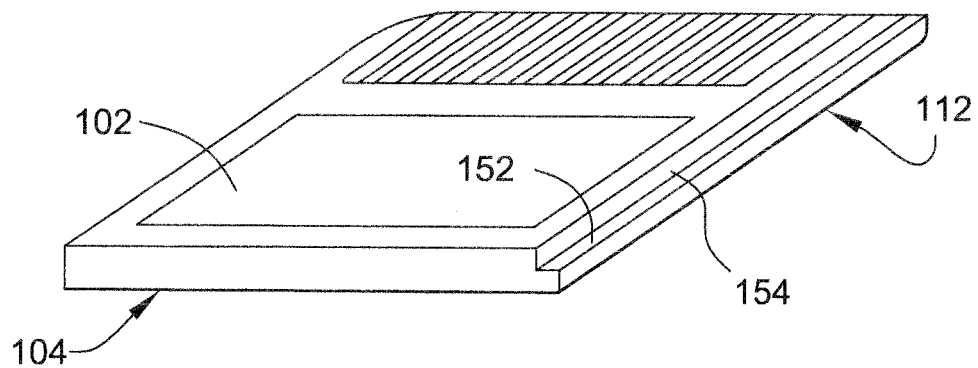
FIG. 7 is a rear perspective view of the game card shown in FIG. 6.
Figure 8:
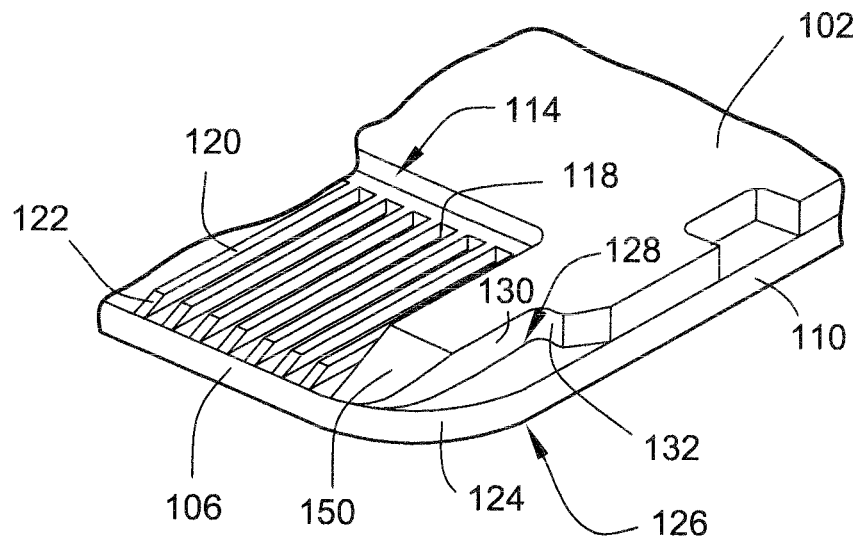
FIG. 8 is an enlarged perspective view of a front, right corner of the card shown in FIG. 6.

The new game or memory card 100 designed especially for use with this game device is shown in FIGS. 6, 7, and 8.

The game or memory card 100 is preferably of molded plastic construction and has substantially planar upper and lower surfaces 102, 104, respectively, a forward edge 106, rearward edge 108 and side edges 110, 112. The forward end of the upper surface 102 is formed with a rectangular recess 114 in which a plurality of terminal strips 116 are located, extending from a rear wall 118 of the recess to the forward edge 106 of the card. The rearward wall 115 of the recess is substantially perpendicular to the upper and lower surfaces 102, 104 but, as a practical matter, is sloped by no more than about 3 degrees simply to facilitate removal of the card from the mold during manufacture of the card. The terminal strips 116 are parallel to each other and are separated by raised ribs 120 that also extend from the rear wall 118 to the forward edge 106. The free ends 122 of the ribs 120 are chamfered as best seen in FIG. 8 to facilitate sliding entry of the card into the slot 58 in the main body 12. Ribs 120 also protect the terminal strips 116 from contact with the users' hands or other objects. The recess 114 and array of terminal strips 116 are not centered along the forward edge 106 of the card, but rather, are offset laterally toward the side edge 112 for a purpose explained in greater detail below.

An enlarged radius 124 is formed at forward corner 126 where the side edge 110 meets forward edge 106. A first notch 128 is formed in corner 126, defined by a vertical notch side wall 130, a vertical notch back wall 132 and a flat notch bottom wall 134. The latter is parallel to the upper and lower card surfaces 102, 104, while notch side wall 130 is parallel to side edges 110, 112, and notch back wall is perpendicular to the notch side wall 130 and parallel to the card forward edge 106. The depth of the notch is about half the approximate ⅛ inch thickness of the card, and the length of the notch is about ¼ inch, which in turn, is about half the length of the recess 114. Rearwardly of the notch 128, along the card side edge 110, there is formed a second notch 136 that opens to the side of the card, defined by parallel side walls 140, 142 and a back wall 144. Side walls 140, 142 are parallel to forward and rearward card edges 106, 108 while back wall 144 is parallel to card side edges 110, 112. An angled surface 145 connects back wall 144 to the edge 110. Here again, the depth of the notch is about half the thickness of the card, and the length of the notch is about ⅛ inch.

Notches 128 and 136 cooperate with components of a "push-push" mechanism inside the game slot 64 to provide controlled, spring-loaded movement of the game card during insertion and ejection.

The opposite forward corner 146 of the card where side edge 112 meets forward edge 106 is defined by a smaller radius than radius 124. Note that the forward surfaces 148, 150 of the card on either side of the recess 114 are also chamfered to substantially the same degree as the chamfer on ribs 120.

Side edge 112 is stepped along its entire length in the upper plane of the card only, as defined by horizontal shoulder 152 that is parallel to upper and lower surfaces 102, 104 and a recessed edge portion shoulder 154 that is parallel to the side edges 110, 112. This shoulder ensures correct orientation of the card when inserted into a game console slot.

The rearward edge 108 of the card is substantially uniform in profile from side edge 110 to side edge 112, with both rearward corners 156, 158 rounded by a radii similar to the radius at corner 146.

The dimensions of the card are matched to the game machine entry slot, and in the exemplary embodiment, the card 100 is substantially square, with a length dimension (front-to-back) of 1⅜", and a width dimension (side-to-side) of 1¼".

Figure 9:
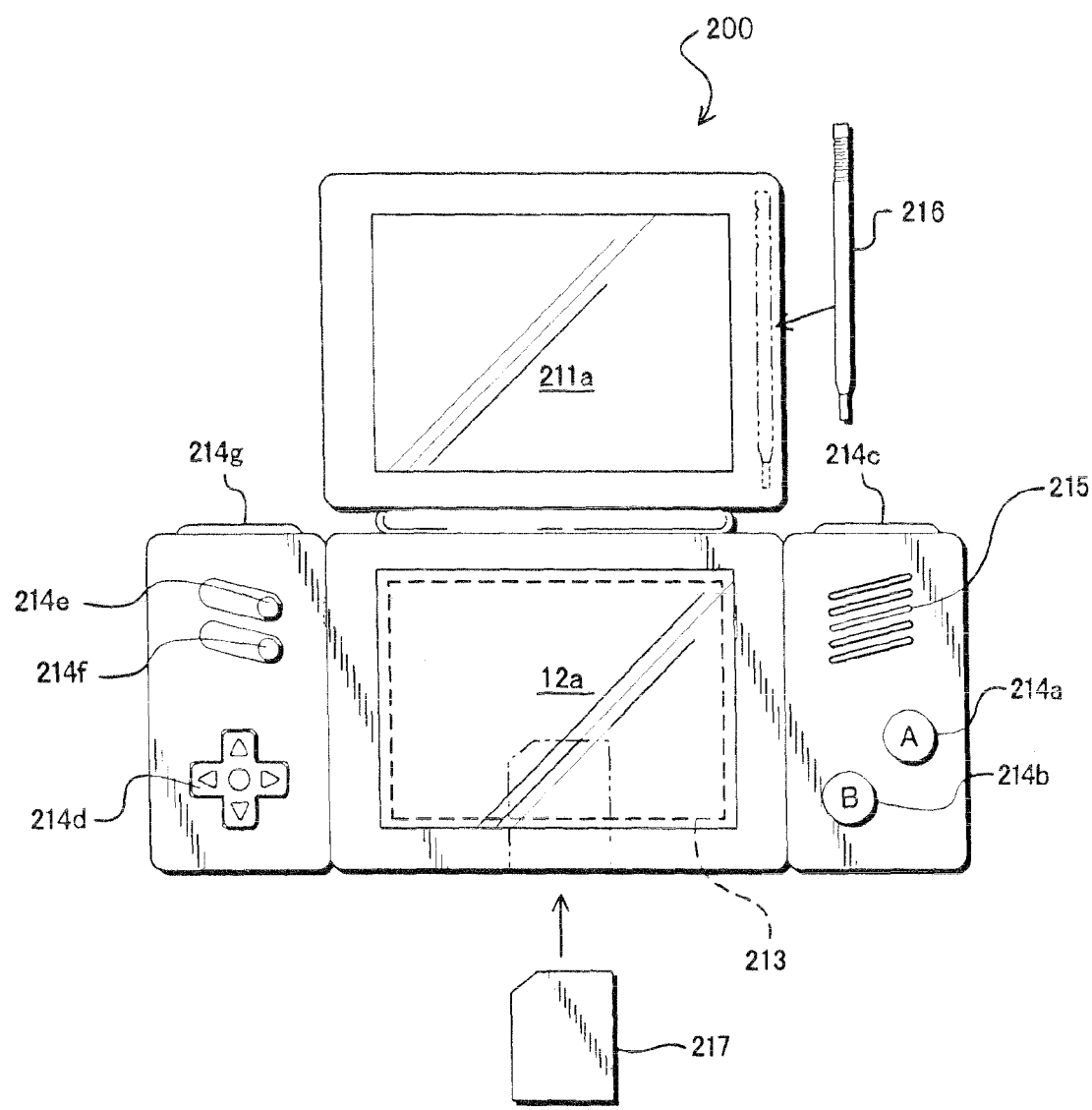
FIG. 9 is an external view of a portable game machine according to a further illustrative embodiment.

FIG. 9 is a further illustrative embodiment of a portable game machine 200. As with the prior embodiment, a further exemplary game machine physically including two display screens with one of the display screens being covered with a touch panel is exemplarily described. In the present embodiment, a game image is displayed on at least the display screen covered with the touch panel. Also, a non-portable video game machine, an arcade game machine, a portable terminal, a cellular phone, or a personal computer may be used as the game machine.

FIG. 9 is an external view of the portable game machine 200. As shown in FIG. 9, the portable game machine 200 includes two display screens, that is, a first display screen 211a and a second display screen 212a. The surface of the second display screen 212a is covered with a touch panel 213. Also, to the right of the second display screen 212a, the game machine includes an A button 214a, a B button 214b, and an R switch 214c, which are operable by the right hand of the player, and a loudspeaker 215 for producing game music. To the left of the second display screen 212a, the game machine includes a cross key 214d, a start button 214e, a select button 214f, and an L switch 214g, which are operable by the left hand of the player. Also, the portable game machine 200 includes a removable stylus 216 for input to the touch panel 213. Furthermore, the portable game machine 200 has, removably inserted therein, a cartridge 217, which is a storage medium having stored therein a game program of the illustrative embodiments. Note that, in the present embodiment, the touch panel 213 is exemplarily provided as an input unit, but this does not restrict the present invention.

Figure 10:
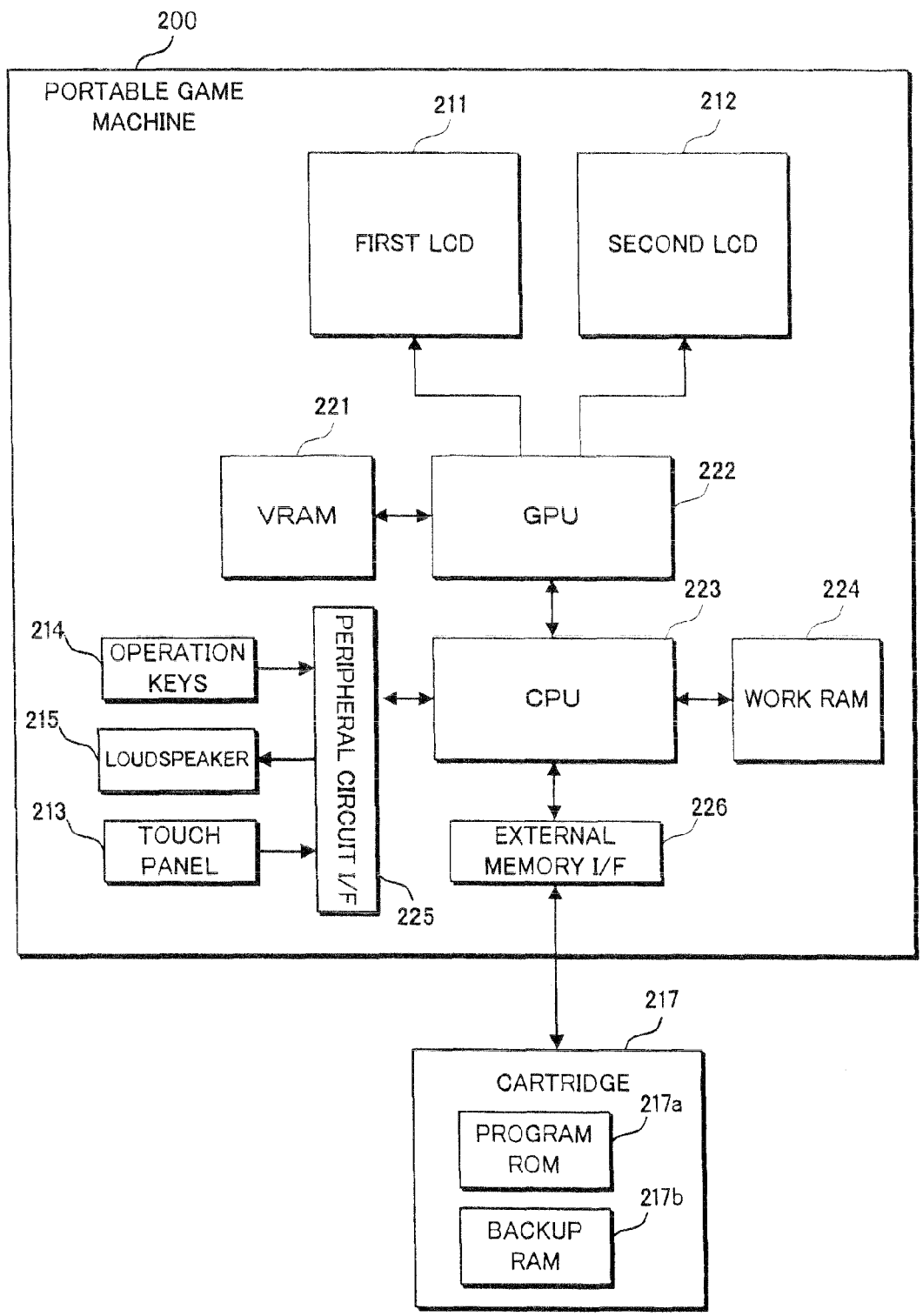
FIG. 10 is an illustration showing an internal configuration of a portable game machine.

FIG. 10 is a block diagram showing the portable game machine 200. It should be understood that the hardware/software and operational description which follows is applicable to the illustrative embodiment shown in FIGS. 1-8 as well as the illustrative embodiment shown in FIG. 9. As shown in FIG. 10, the portable game machine 200 includes a CPU (central processing unit) 223, which is an example of a computer for executing the game program, and other components. The CPU 223 includes a work RAM (working storage unit) 224, a GPU (graphic processing unit) 222, and a peripheral circuit I/F (interface) 225 that are electrically connected to one another. The work RAM 224 is a memory for temporarily storing, for example, the game program to be executed by the CPU 223 and calculation results of the CPU 223. The GPU 222 uses, in response to an instruction from the CPU 223, a VRAM 221 to generate a game image for display output to a first LCD (liquid crystal display unit) 211 and a second LCD 212, and causes the generated game image to be displayed on the first display screen 211a of the first LCD 211 and the second display screen 212a of the second LCD 212. The peripheral circuit IT 225 is a circuit for transmitting and receiving data between external input/output units, such as the touch panel 213, the operation keys 214, and the loudspeaker 215, and the CPU 223. The touch panel 213 (including a device driver for the touch panel) outputs coordinate data corresponding to a position input (specified) with the stylus 216.

Furthermore, the CPU 223 is electrically connected to the external memory I/F 226, in which the cartridge 217 is inserted. The cartridge 217 is a storage medium for storing the game program and, specifically, includes a program ROM 217a for storing the game program and a backup RAM 217b for rewritably storing backup data. The game program stored in the program ROM 217a of the cartridge 217 is loaded to the work RAM 224 and is then executed by the CPU 223. In the present embodiment, an exemplary case is described in which the game program is supplied from an external storage medium to the portable game machine 200. However, the game program may be stored in a non-volatile memory incorporated in advance in the portable game machine 200, or may be supplied to the portable game machine 200 via a wired or wireless communication circuit.

Figure 11:
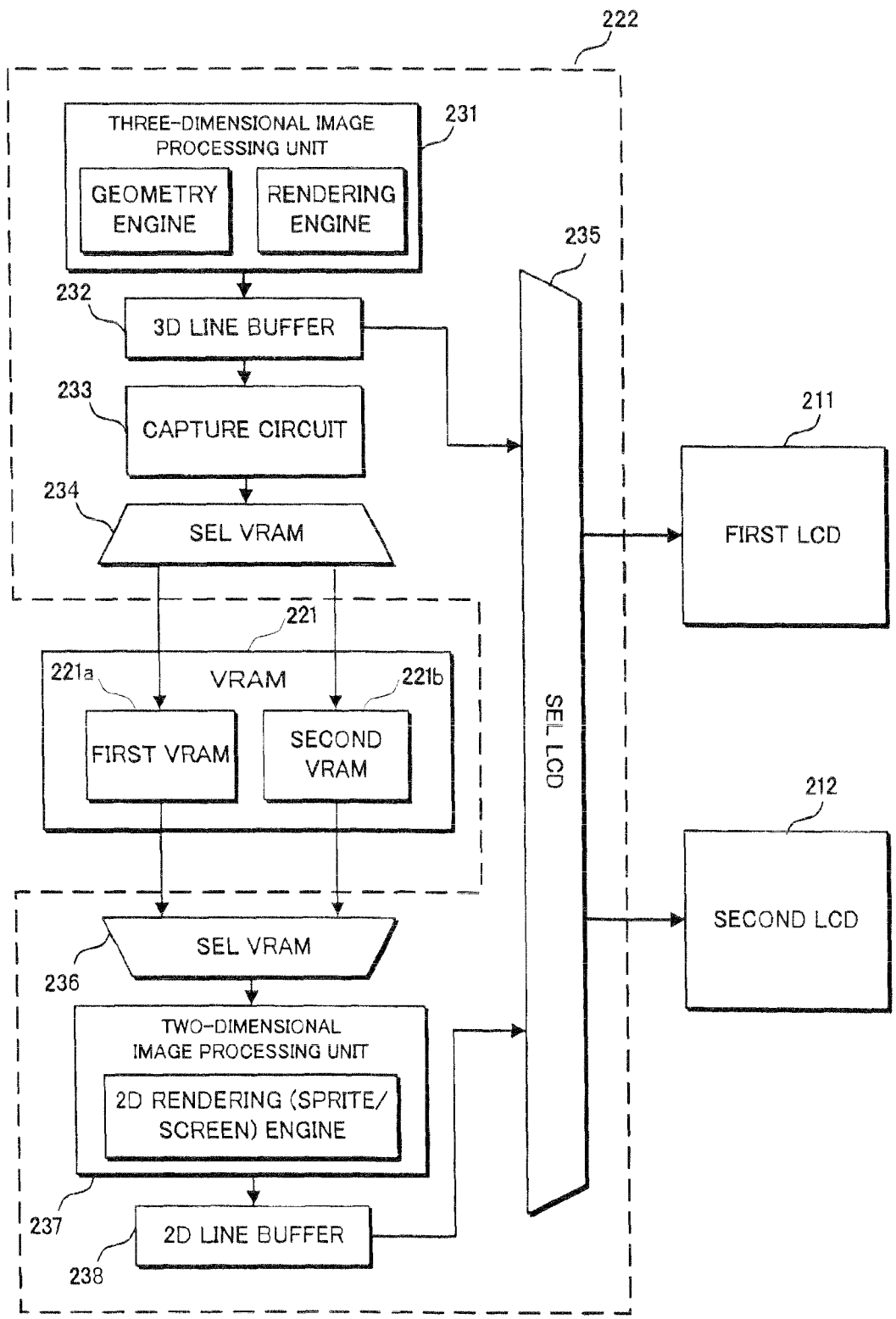
FIG. 11 is an illustration showing an internal configuration of a GPU 222.

FIG. 11 is a block diagram of the GPU 222. The GPU 222 includes two image processing units, that is, a three-dimensional image processing unit 231 and a two-dimensional image processing unit 237. The three-dimensional image processing unit 231 includes a geometry engine for calculating each vertex of a three-dimensional model based on three-dimensional model data and a rendering engine for generating a game image from the three-dimensional model disposed on a virtual three-dimensional game space. The two-dimensional image processing unit 237 includes a 2D rendering engine for generating a game image based on two-dimensional image data representing characters and two-dimensional image data representing backgrounds. More specifically, the two-dimensional image processing unit 237 disposes a two-dimensional image representing a character on a virtual screen called a "sprite" and a two-dimensional image representing a background on a virtual screen called a "screen," and then synthesizes these virtual screens to generate a game image to be eventually displayed.

The three-dimensional image processing unit 231 is connected to the 3D line buffer 232. The 3D line buffer 232 is a buffer memory for temporarily retaining image data for one scanning line of the first LCD 211 (or the second LCD 212). The image data generated by the three-dimensional image processing unit 231 is stored in this 3D line buffer 232 sequentially by one line.

The 3D line buffer 232 is connected to a capture circuit 233 and an LCD selector (SEL LCD) 235. The capture circuit 233 sequentially reads image data for one line stored in the 3D line buffer 232 and then sequentially stores the read image data in the VRAM 221, which will be described further below, thereby capturing the game image generated by the three-dimensional image processing unit 231.

The capture circuit 233 is connected to a VRAM selector (SEL VRAM) 234. The VRAM 221 is provided with two VRAMs, that is, a first VRAM 221a and a second VRAM 221b. Instead of these two first and second VRAMs 221a and 221b, a single VRAM may be used with its two different storage areas being used as the first VRAM 221a and the second VRAM 221b. The VRAM selector 234 switches an output destination of the capture circuit 233 between the first VRAM 221a and the second VRAM 221b.

The first VRAM 221a and the second VRAM 221b are connected to a VRAM selector (SEL VRAM) 236. The VRAM selector 236 switches a source of data to the two-dimensional image processing unit 237 between the first VRAM 21a and the second VRAM 221b.

The two-dimensional image processing unit 237 is connected to a 2D line buffer 238. As with the 3D line buffer 232, the 2D line buffer 238 is a buffer memory for temporarily retaining image data for one scanning line of the second LCD 212. The image data generated by the two-dimensional image processing unit 237 is stored in this 2D line buffer 238 sequentially by one line.

The 2D line buffer 238 is connected to an LCD selector 235. The LCD selector 235 switches an output destination of the 3D line buffer 232 between the first LCD 211 and the second LCD 212, and an output destination of the 2D line buffer 238 between the first LCD 211 and the second LCD 212. In the present embodiment, the LCD selector 235 performs control such that, when the output of the 3D line buffer 232 is supplied to the first LCD 11, the output of the 2D line buffer 38 is supplied to the second LCD 212, and when the output of the 3D line buffer 232 is supplied to the second LCD 212, the output of the 2D line buffer 238 is supplied to the first LCD 211.

The portable game machine 200 has the above-described structure. Generally, the game image generated by the three-dimensional image processing unit 231 is supplied via the 3D line buffer 232 and the LCD selector 235 to the first LCD 211, while the game image generated by the two-dimensional image processing unit 237 is supplied via the 2D line buffer 238 and the LCD selector 235 to the second LCD 212. As a result, the three-dimensional game image generated by the three-dimensional image processing unit 231 is displayed on the first display screen 211a, while the two-dimensional game image generated by the two-dimensional image processing unit 237 is displayed on the second display screen 212a. However, the present embodiment has a feature in which the above-structured portable game machine 200 is used to display different three-dimensional game images on two display screens, that is, the first display screen 211a and the second display screen 212a. Hereinafter, the operation of the portable game machine 200 according to the present embodiment is described.

The portable game machine 200 alternately performs operations with periods of one frame. Hereinafter, the operation of the portable game machine 200 is described as being divided into a process in an odd-numbered frame and a process in an even-numbered frame, Note that the "odd-numbered frame" and the "even-numbered frame" are merely so called for convenience. In other words, if one frame is assumed to be an odd-numbered frame, frames before and after that frames are even-numbered frames. Conversely, if one frame is assumed to be an even-numbered frame, frames before and after that frames are odd-numbered frames.

Figure 12:
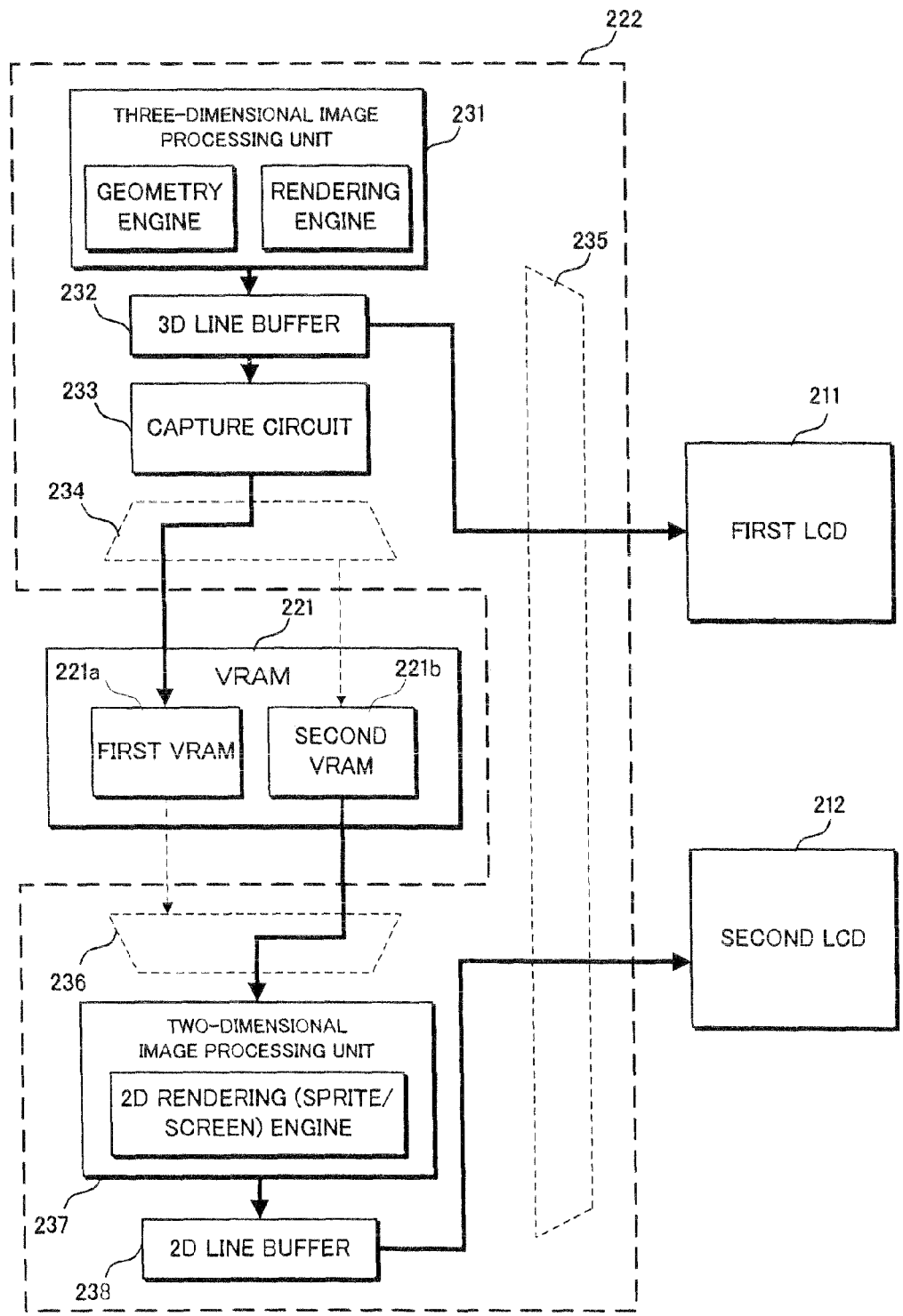
FIG. 12 is an illustration showing the operation of a portable game machine in an odd-numbered frame.

FIG. 12 is an illustration showing the operation of the portable game machine 200 in an odd-numbered frame. As shown in FIG. 12, in the odd-numbered frame, the game image generated by the three-dimensional image processing unit 231 is supplied via the 3D line buffer 232 to the first LCD 211. Also, the output from the capture circuit 233 is supplied to the first VRAM 221a. That is, the game image supplied in this frame to the first LCD 211 is captured by the capture circuit 233, and is then stored in the first VRAM 221a. Also, the two-dimensional image processing unit 237 reads the game image stored in the second VRAM 221b (the game image captured in the immediately-preceding even-numbered frame by the capture circuit 233, as will be described further below). This game image is, as will be described further below, identical to the game image supplied in the immediately-preceding even-numbered frame to the second LCD 212. The game image read by the two-dimensional image processing unit 237 is supplied via the 2D line buffer 238 to the second LCD 212. As such, in the odd-numbered frame, the game image generated in this frame by the three-dimensional image processing unit 231 is supplied to the first LCD 211, while the game image generated in the immediately-preceding even-numbered frame by the three-dimensional image processing unit 231 is supplied to the second LCD 212.

Figure 13:
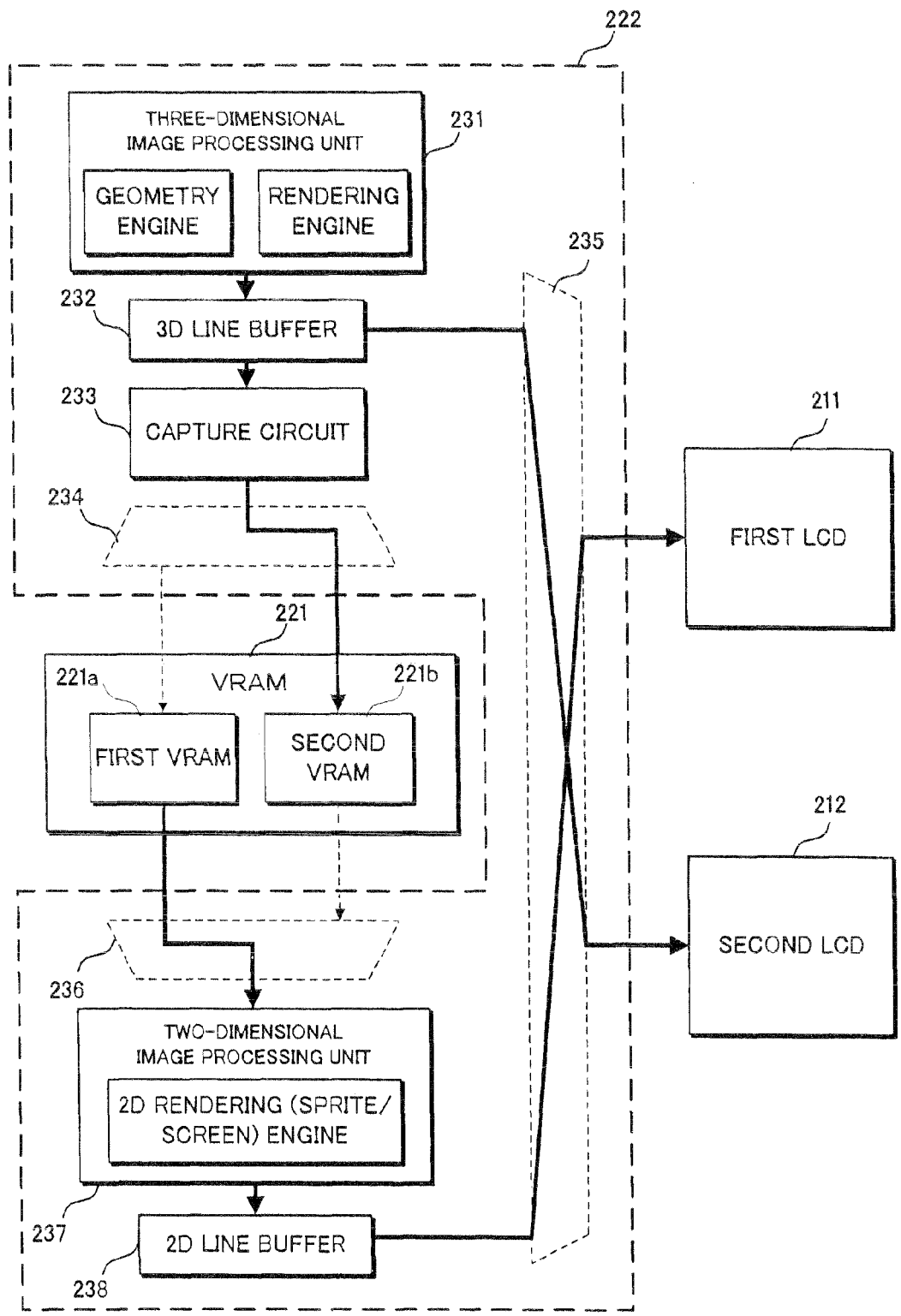
FIG. 13 is an illustration showing the operation of the portable game machine in an even-numbered frame.

FIG. 13 is an illustration showing the operation of the portable game machine 200 in an even-numbered frame. As shown in FIG. 13, in the even-numbered frame, the game image generated by the three-dimensional image processing unit 231 is supplied via the 3D line buffer 232 to the second LCD 212. Also, the output from the capture circuit 233 is supplied to the second VRAM 221b. That is, the game image supplied in this frame to the second LCD 212 is captured by the capture circuit 233, and is then stored in the second VRAM 221b. Also, the two-dimensional image processing unit 237 reads the game image stored in the first VRAM 221a (the game image captured in the immediately-preceding odd-numbered frame by the capture circuit 233, as will be described further below). This game image is identical to the game image supplied in the immediately-preceding odd-numbered frame to the first LCD 211. The game image read by the two-dimensional image processing unit 237 is supplied via the 2D line buffer 238 to the first LCD 211. As such, in the even-numbered frame, the game image generated in this frame by the three-dimensional image processing unit 231 is supplied to the second LCD 212, while the game image generated in the immediately-preceding odd-numbered frame by the three-dimensional image processing unit 231 is supplied to the first LCD 211.

As one embodiment, the portable game machine having a hardware structure as shown in FIGS. 10 and 11 has been described. However, exemplary embodiments may be applied not only to the portable game machine having such a hardware structure, but to the one having the above hardware structure achieved by the CPU and software. Also, the portable game machine according to the present embodiment can be emulated by a computer system, such as a personal computer or a portable information terminal. In this case, a game program that causes the computer system to achieve each hardware function of the portable game machine according to the present embodiment is supplied to the computer system. With this, exemplary embodiments can be applied also to a general-purpose computer system.

Furthermore, certain exemplary embodiments may be provided on portable or non-portable game consoles, computer systems, and/or the like including, for example, the Nintendo DS, DSi, GameCube, Wii, personal computers, websites, interactive video, etc. When these and/or other devices are used, other pointing or other user input devices apart from, or in addition to, the stylus described above may be used. For example, a variety of pointing devices is known and includes styluses, pens, etc. A user's finger (e.g., index finger) also may be used in connection with different embodiments. The Wii remote is another pointing device that may be used in connection with different embodiments.

Super Guide

Figure 14:
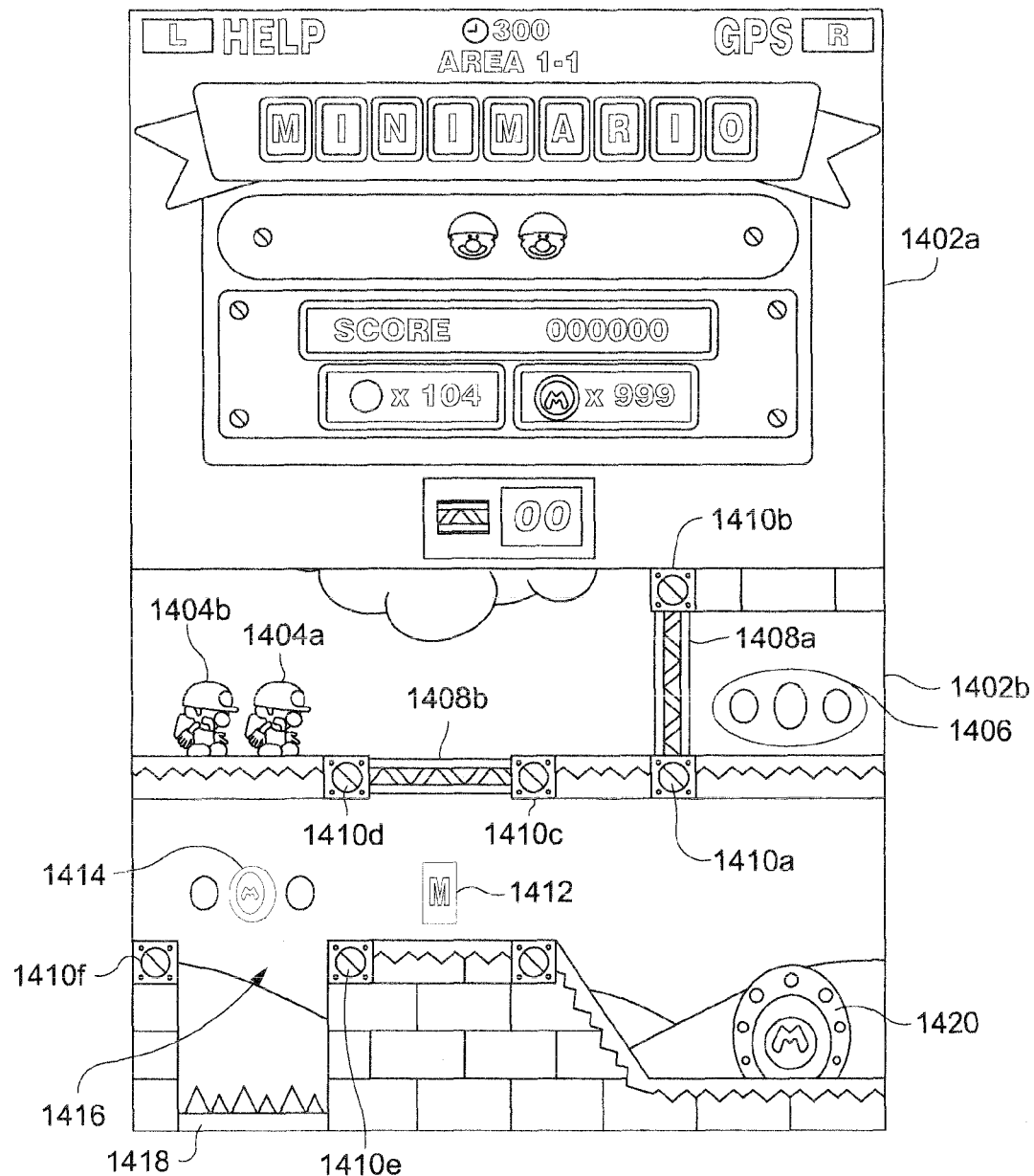
FIG. 14 is a first illustrative view of a game image in accordance with an exemplary embodiment.

A description of the exemplary improved Super Guide techniques will now be provided in connection with an exemplary game scenario and with reference to FIGS. 14-20. FIG. 14, for example, shows a general, initial layout of a game area. The game area comprises first and second display areas 1402a and 1402b, which may be located on first and second displays of the game apparatus of FIG. 1, for instance. The first display area 1402a includes general information about the game including, for example, the number of player character "lives," a current score, a number of coins, a number of items to be selectively used during the course of the game level, etc.

The second display area 1402b is where most of the "action" takes place in this exemplary game. First and second player characters 1404a and 1404b are provided. In this exemplary game, once "activated," the player characters move in a direction until they encounter an obstruction, trap, exit, pipe, etc. In the initial layout in FIG. 14, once actuated, the player characters 1404a and 1404b would walk over the girder 1408b and reach girder 1408a. The path of the player characters 1404a and 1404b would then be obstructed, and they would turn around after "hitting" the obstruction. In general, the second display area 1402b includes coins 1406, girders 1408 that are connected to respective rivets 1410, an item 1412 to be used in connection with the current level, a pass 1414 out of the current level (e.g., and into the next level), holes 1416, spikes 1418 that cause the player characters 1404a and 1404b to die, an exit out of the current level 1420, etc.

Figure 15:
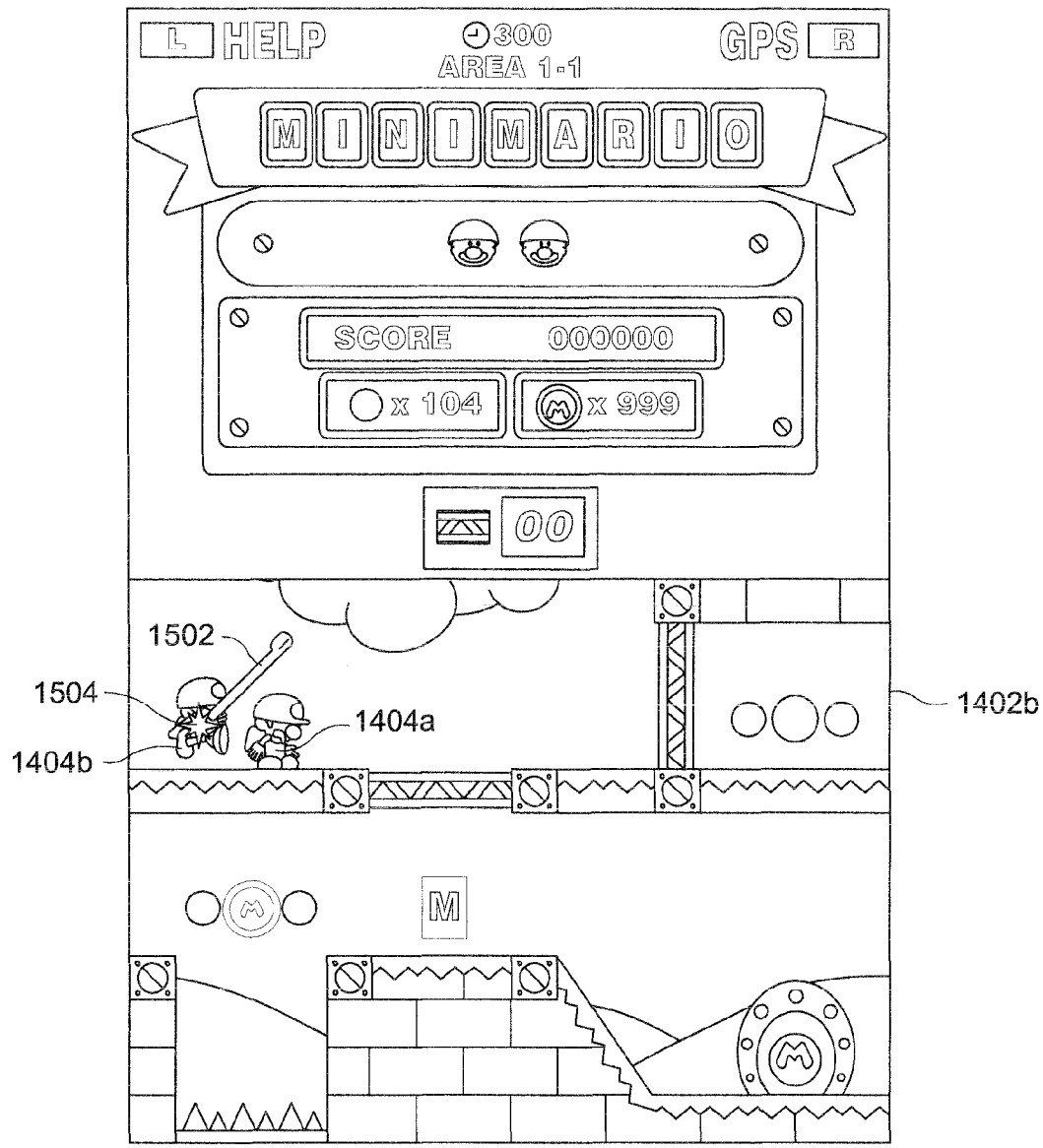
FIG. 15 is a second illustrative view of a game image in accordance with an exemplary embodiment.
Figure 16:
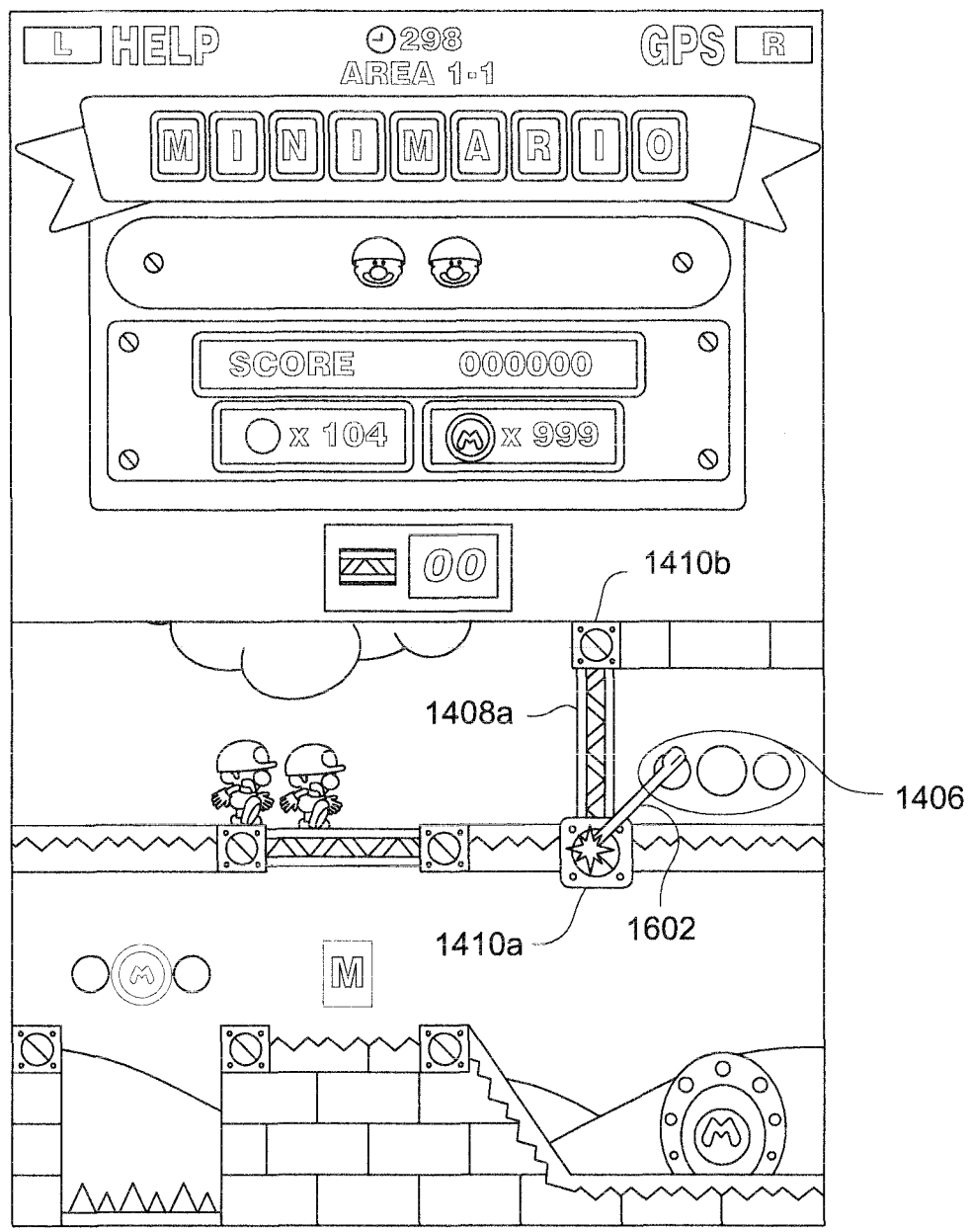
FIG. 16 is a third illustrative view of a game image in accordance with an exemplary embodiment.

The player may request help via the Super Guide, e.g., by pressing the right trigger button in certain implementations. When the Super Guide feature is activated, the next step may be determined. In the case of FIG. 15, this involves initiating the movement of the second player character 1404b such that the second player character 1404b will run into the first player character 1404a and cause them both to move from left to right across the second display area 1402b. In that regard, the stylus icon 1502 appears proximate to the second player character 1404b to visually instruct the player what to do. A visual indicator 1504 (in this example case, a star) appears at the location to be touched which in this example instance, as noted above, is over the second player character 1404b. Because a stylus is used to control the actions in the above-described example, a stylus icon is shown on the screen and moved around to demonstrate how to the particular actions are to be performed in marching towards the ultimate solution.

Although the recorded "stylus down" event may have taken a fraction of a second, the stylus icon 1502 and/or the visual indicator 1504 may be displayed for a predetermined amount of time greater than the actual fraction of a second during which the stylus down event occurs. Elongating the display (e.g., of the action to be taken or suggested to be taken) in this way helps the player more clearly visualize and process what action should be taken. Had the stylus touch down event simply been recorded and played back, there is a chance that this action would occur so quickly that the player would not even notice it happening, would not fully apprehend the action to be taken, etc. It will be appreciated that in such scenarios, the usefulness and underlying purpose of the Super Guide may be thwarted in whole or in part and/or its value may otherwise be diminished to a level less than its full potential, possibly even leading to increased frustration rather than general helpfulness. This is particularly true when complicated stylus movements are required, where there is a lot of potentially distracting activity taking place on the display(s), etc. The predetermined amount of time may still be relatively short and sometimes even less than a second (e.g., one-half second) while enabling the value of the Super Guide to be realized.

In certain exemplary embodiments, the display of the stylus and/or the indicator may last until the player has taken the desired action or has taken some other action (e.g., selected a different path, removed a girder, died, etc.). However, in certain exemplary embodiments, actuating the Super Guide feature may cause the desired action to take place automatically (e.g., without direct human user control). In certain exemplary embodiments, essential actions may take place automatically whereas optional activities (e.g., non-required points-earning activities) may not take place automatically, or vice versa. In certain exemplary embodiments, some activities may be automatic and some may require direct human input.

As indicated above, the player characters 1404a and 1404b will move once initiated, as in FIG. 15. This will cause them to move in the direction of the girder 1408a, which is held in place by first and second rivets 1410a and 1410b. If the player were to actuate the Super Guide feature at this time, the next move to be made would involve the collection of the coins 1406. To accomplish this, the Super Guide would indicate to the player that the girder 1408a would have to be removed. This would be signaled by displaying the stylus icon 1602 and highlighting the first rivet 1410a (or the second rivet 1410b). Similar to the above, the stylus icon 1602 and/or the indicator 1604 proximate the first rivet 1410a may be highlighted for a predetermined amount of time.

Figure 17:
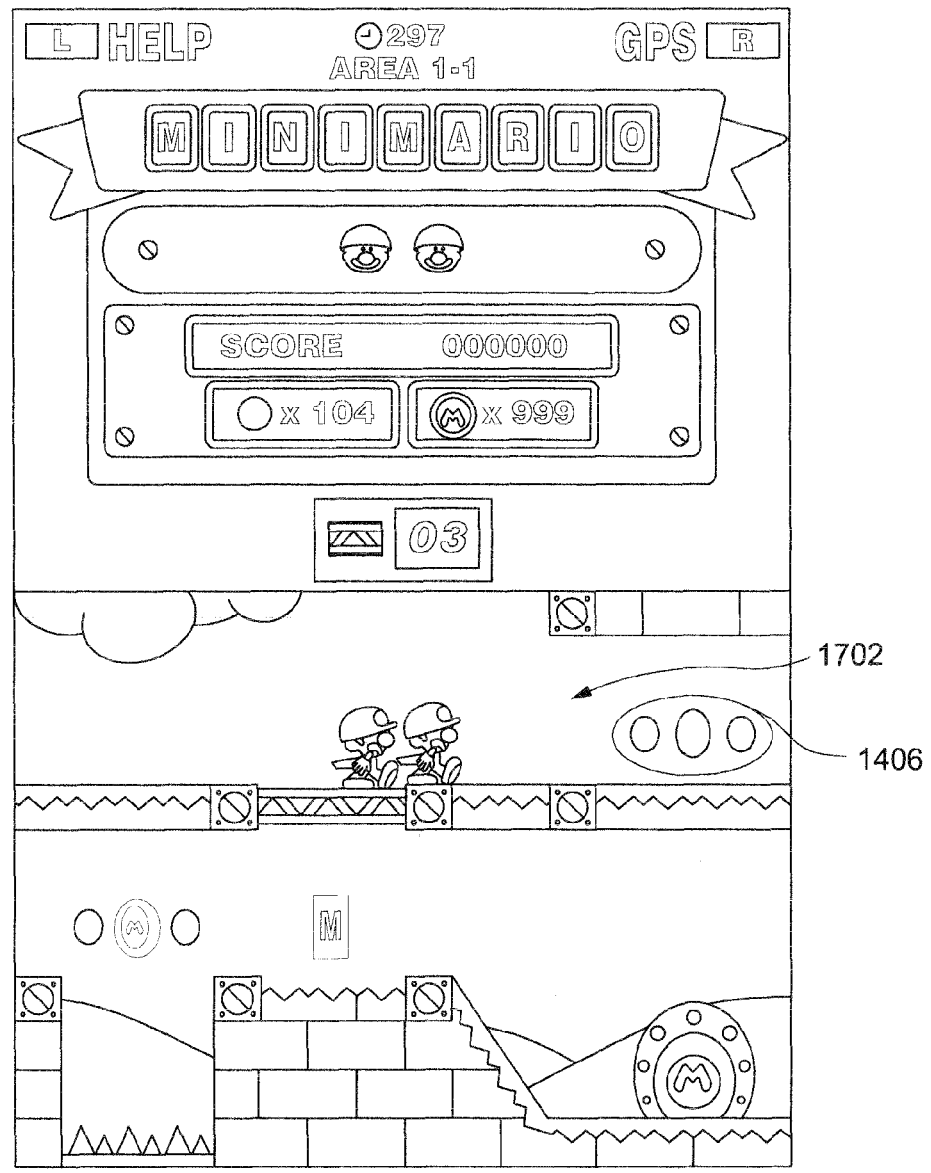
FIG. 17 is a fourth illustrative view of a game image in accordance with an exemplary embodiment.

Once the girder 1408a is removed, an opening 1702 will be present as shown perhaps best in FIG. 17. Thus, the player characters 1404a and 1404b can move towards and ultimately collect the coins 1406 without encountering any obstructions. In certain exemplary embodiments, the removal of a girder 1408 may credit the user with a predefined amount of links. The number of links may be related to the size of the girder: Note that this information is updated in the first display area 1402a in FIG. 17.

Figure 18:
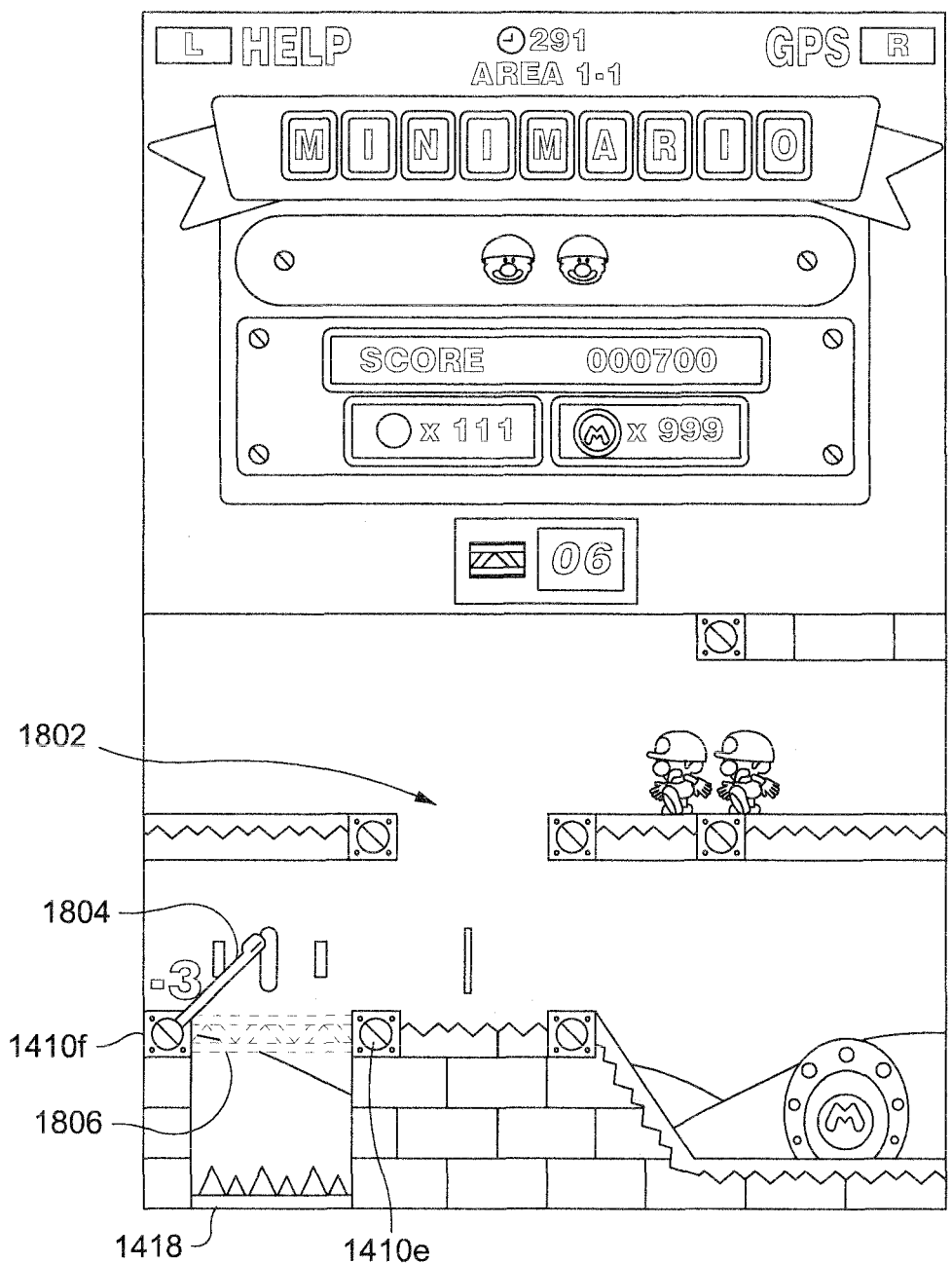
FIG. 18 is a fifth illustrative view of a game image in accordance with an exemplary embodiment.

FIG. 18 shows a hole 1802 that results when the girder 1408b (e.g., in FIG. 14) is removed. Note that the number of link is now 6 as indicated first display area 1402a. Because the player characters have started to move from right to left, they will fall down the hole 1802 and begin to approach the spikes 1418 as they continue to move from right to left. This would cause the player characters to die if action were not taken. Actuating the Super Guide at this time therefore indicates that a new girder 1806 should be constructed over the spikes 1418. Accordingly, the Super Guide shows the stylus icon 1804. The new girder 1806 has to be connected to an area between two rivets 1410. Thus, rather than being displaying the stylus icon 1804 at a fixed location, the stylus icon will be displayed proximate to the first rivet 1410e and moved to a location proximate to the second rivet 1410f. To increase the automated or mechanical feel of the Super Guide feature in this instance, for example, when a girder is being placed and auto-snaps to a destination rivet, the stylus icon 1804 may also immediately snap to the destination rivet location. Similar to the above, the stylus icon 1804 may be displayed for a predetermined amount of time and/or moved at a suitable speed such that the recommended action to be taken is perceptible to the player.

Figure 19:
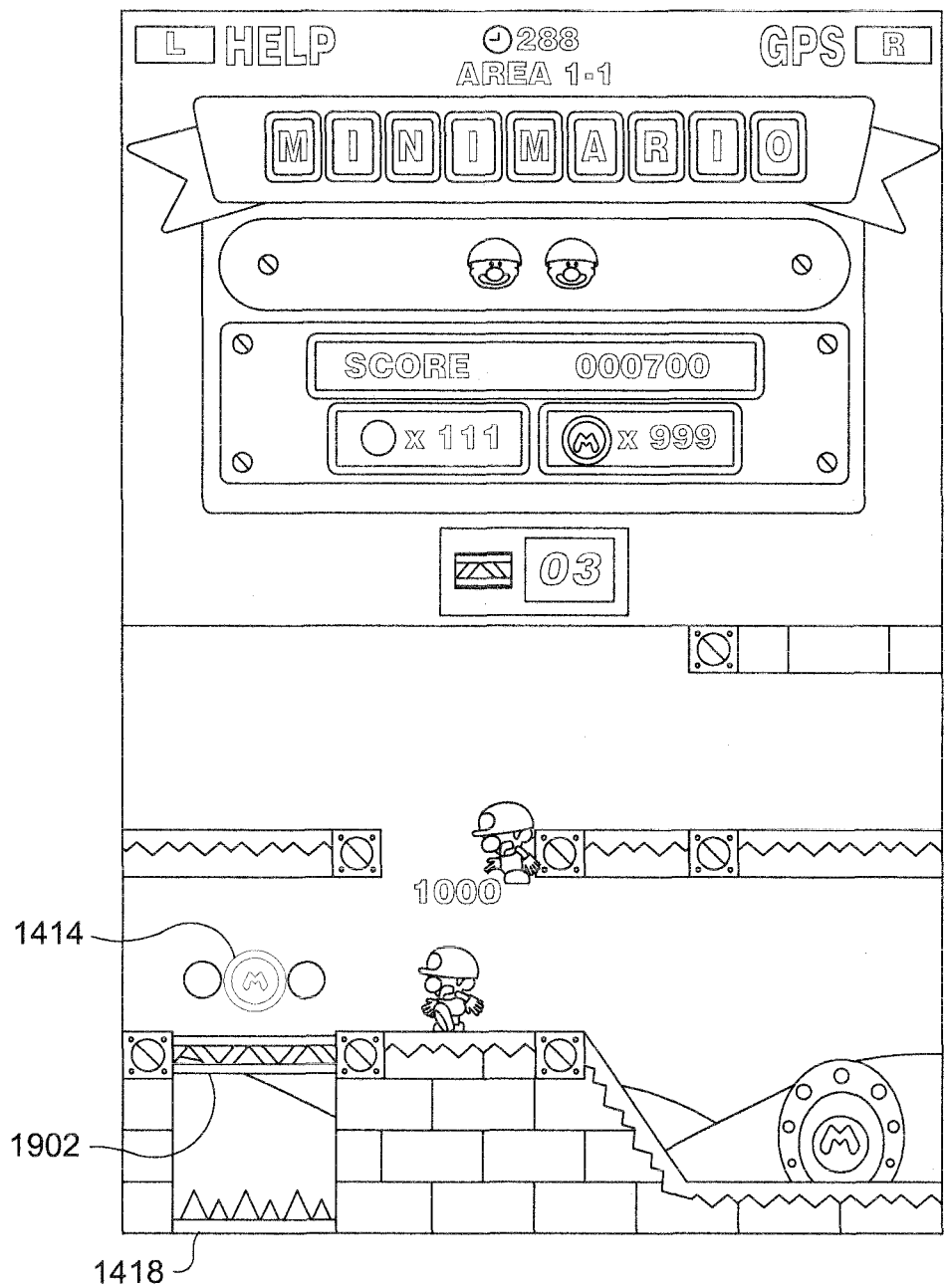
FIG. 19 is a sixth illustrative view of a game image in accordance with an exemplary embodiment.

In FIG. 19, the placement of the new girder 1902 is complete, and the player characters can collect the unique item 1414 without falling into the spikes 1418. Note that the completion of the new girder 1902 "cost" 3 links, and the number of links is updated in the first display area 1402a.

Figure 20:
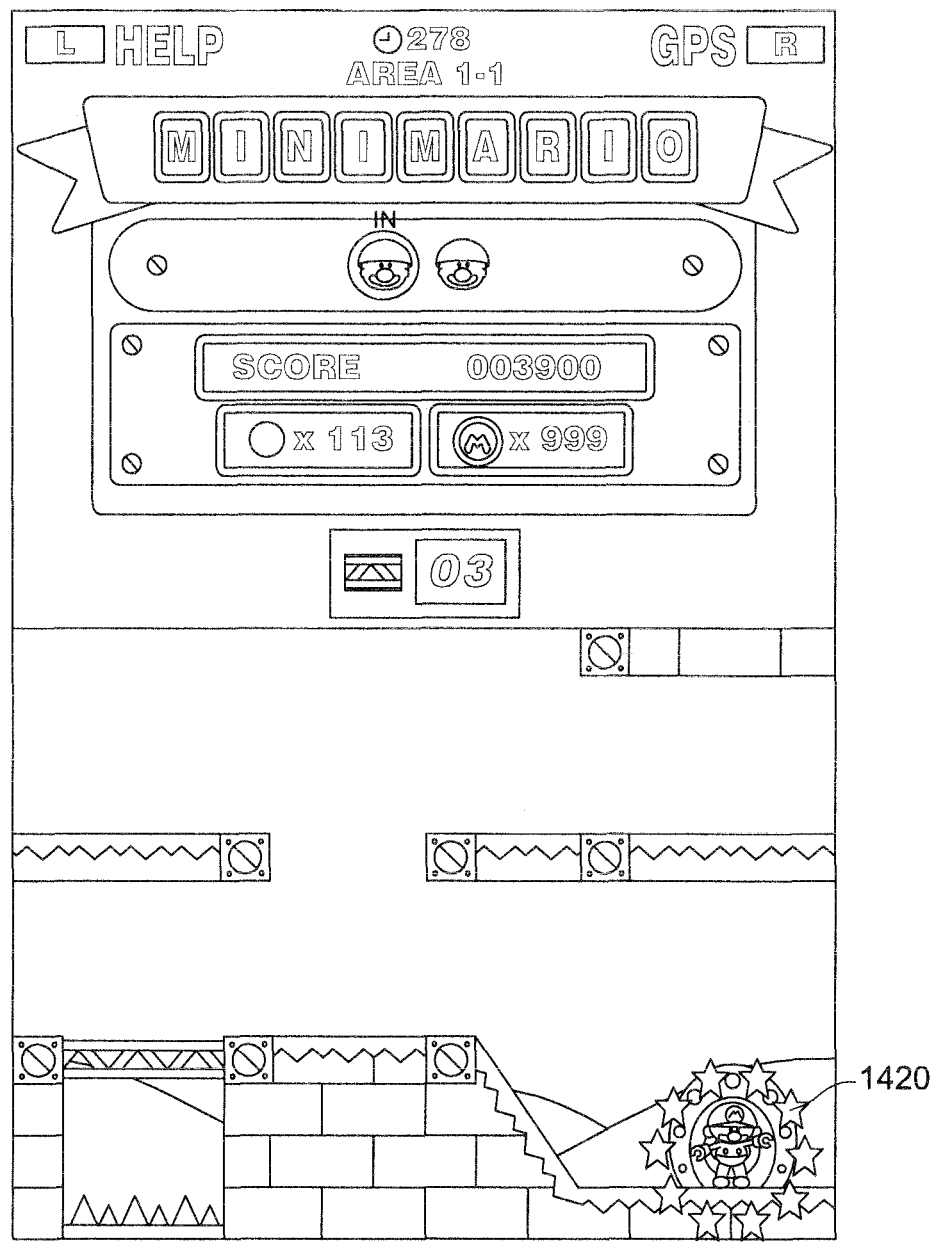
FIG. 20 is a seventh illustrative view of a game image in accordance with an exemplary embodiment.

In FIG. 20, the player characters 1404a and 1404b successfully reach the exit. Having used the Super Guide feature, the player has obtained the maximum number of coins 1406, the pass out of the level 1412, and the unique item 1414 and has not lost any lives. Note that it is possible to advance without having achieved the foregoing. For instance, referring once again to FIG. 14, the girder 1408b could have been removed prior to the first and second player characters 1404a and 1404b moving, and or just as they begin to move from left to right. In addition, a girder could be placed vertically from rivet 1410e to rivet 1410d so as to seal off the spikes 1418 as the player character moves towards the spikes 1418. In certain exemplary embodiments, the Super Guide may provide the optimal or best path or character motion available given the current set of circumstances. This may involve, for instance, dynamically calculating the payoffs of different available options, searching through a predefined set of possible solutions for the best available remaining path, etc. In some cases, of course, the best solution may be a "restart" of the level, and an indication of the same may be provided.

Figure 21:
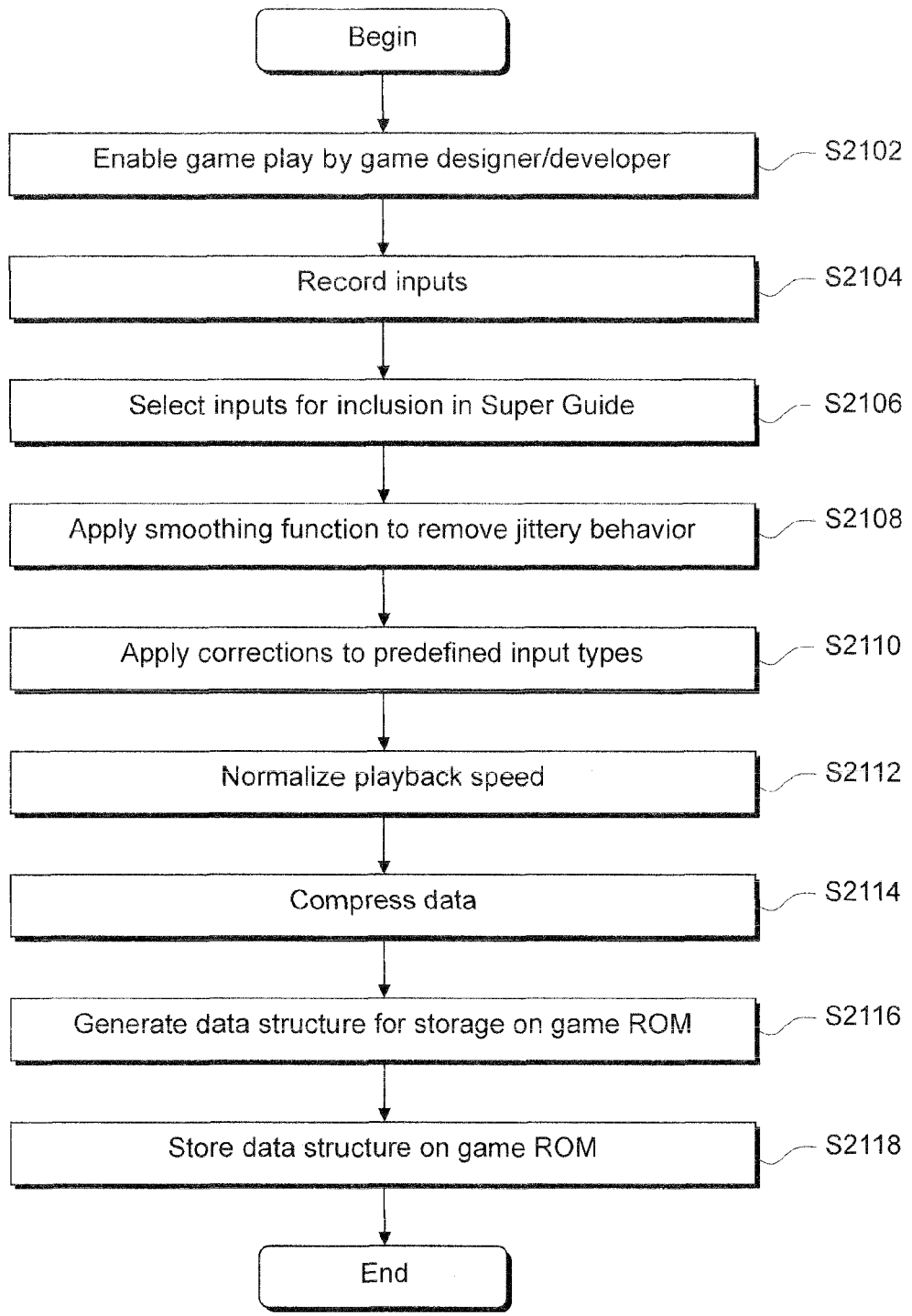
FIG. 21 is a flowchart showing an illustrative process for creating an improved Super Guide in accordance with an exemplary embodiment.

FIG. 21 is a flowchart showing an illustrative process for creating an improved Super Guide in accordance with an exemplary embodiment. In step S2102, game play is enabled for the designer, developer, or other person whose inputs are to be recorded in creating the Super Guide. Once the game play scenario is started, those inputs are actually recorded in step S2104, Not all inputs need to be included in the Super Guide. For example, mistaken or extraneous moves need not be included. Thus, it will be appreciated that the Super Guide may include only a proper subset of all possible moves. In step S2106, those particular inputs for inclusion in the Super Guide are selected. A useful way to create the file is to record actual user inputs as events, and to store the events in a memory for consistent later playback.

In order to make the playback look more mechanical, robotic, computer-generated, or the like, (and thus less organic and dependent upon any idiosyncrasies of the person providing the input), modifications such as smoothing, filtering, or other processing may be made to the recorded inputs. For example, in step S2108, a smoothing function may be applied to remove any jittery behavior caused by, for example, the person's hand shaking, bumps to the controller, lack of resolution in the capture device, randomness in the capture process, etc. The smoothing function may involve any suitable technique. For example, a start and end point may be determined and the path therebetween may be inferred or interpolated, e.g., using Euclidean geometry, linear, or other interpolation techniques. As another example, lines may be snapped to a grid having cells that are several pixels in each dimension such that straighter lines and/or segments of lines are provided. As still another example, a projected path may be calculated based on start and end points, and any movement more than a predetermined amount outside of that path may be corrected to within, for example, this sort of acceptable deviation. Low pass filtering can also be used to remove high frequency jitter or other effects. Of course, it will be appreciated that such smoothing techniques are provided by way of example and that other smoothing techniques may be used in connection with different embodiments of this invention.

Figure 22:
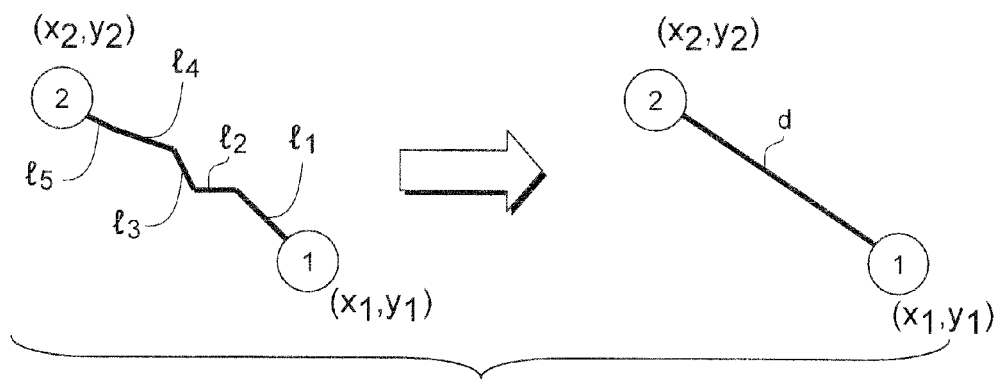
FIG. 22 demonstrate an operational principle of the Super Guide smoothing technique of certain exemplary embodiments.
Figure 23:
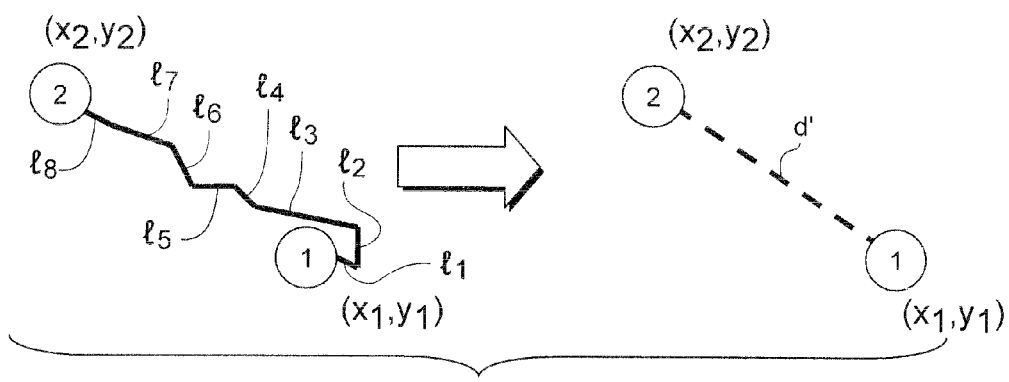
FIG. 23 demonstrates further operational principles of the Super Guide smoothing technique of certain exemplary embodiments.

FIGS. 22 and 23 demonstrate operational principles of the Super Guide smoothing techniques of certain exemplary embodiments. The left side of FIG. 22, for example, is an example user input from a start location (1) to an end location (2). The start and end locations have two-dimensional coordinates associated therewith. Of course, these coordinates may be provided in other spaces, e.g., such as in three-dimensional space. In any event, the raw recorded input comprises a plurality of line segments, 11, 12, 13, and 14. This input is smoothed to form a single path d as shown at the right of FIG. 22 using, for example, one of the above-described and/or other smoothing techniques.

FIG. 23 is similar to FIG. 22. The raw recorded input comprises a plurality of line segments, 11, 12, 13, 14, 15, 16, 17, and 18 and instead corresponds to a girder being snapped into place. The initial segments 11 and 12 generally are in the wrong ultimate direction, and these portions are clearly filtered out as the overall input is smoothed to form a single path d' as shown at the right of FIG. 23. The initial segments 11 and 12 may be detected as being in the wrong general direction and removed prior to the application of one of the above-described and/or other smoothing techniques. The dashed line to the right of FIG. 23 indicates graphically that the action to take place is a snap-action.

In certain exemplary embodiments, one or more smoothing techniques may be applied to one or more potentially varying degrees. This approach may generate plural possible smoothed out actions. The game designer or other party responsible for creating the Super Guide may then select one smoothed action from the plurality of generated possible smoothed actions. The selection may help to ensure that the action does not become "too smoothed," e.g., such that valuable movement information is lost or results in a technically or practically impossible suggestion to the ultimate end-user of the Super Guide. Similarly, in certain exemplary embodiments, a designer or other party may choose to repeatedly or iteratively apply successive one or more smoothing functions so as to generate a desired guiding movement or action suitable for the ultimate end-user of the Super Guide. For instance, a game designer may apply a first low-pass filter to remove some jitters and determine that the low-pass filter should be run again because not enough of the jittery movement has been removed. In addition, or in the alternative, e.g., once a suitable amount of jitters have been removed, geometric techniques may be applied to come up with a suitable straight path between start and end points. In certain exemplary embodiments, one or more waypoints may be added along the path via suitable designer inputs and the smoothing function to be applied may be a curved path (rather than a linear path or a series of linear paths) that appears to be mechanical but not "too mechanical."

Referring once again to FIG. 21, in addition to, or apart from, the smoothing in step S2108, further corrections may be provided in step S2110 for certain predefined input types. For instance, when a stylus touch is detected (e.g., in connection with the initiation of the player character in FIG. 15, the removal of the girder in FIG. 16, etc.), a correction may be made to ensure that the icon is displayed on the screen for a predetermined amount of time, even if the real recorded input data has already been released or is still taking place. This kind of correction makes it easier for the player to see and determine what is taking place and also provides consistency across different actions, recorders, etc. Likewise, an optional indicator also may stay on screen (and/or at a location) for a predetermined time to make the action more consistent looking between inputs, to give user a better idea how to provide input (e.g., where to touch, how to move, etc.), and/or to increase the overall mechanical feel of the game.

For girder placement (e.g., as shown in FIG. 18, for example), when the girder is being placed and auto-snaps to a destination rivet, the stylus location may also immediately snap to the rivet location, even though the real input is not actually touching the rivet. As above, the stylus may be displayed for a predetermined amount of time on that destination rivet to make it easier for the user to see what has happened and/or what is supposed to happen. Thus, locations "in the middle" of the start and end rivets may not be fully displayed. It will be appreciated that other types of actions may be flagged for modification in addition to, or apart from, smoothing. For example, ladder placement, pipe selection, etc., may be suitably flagged in connection with this example game scenario.

In step S2112, the playback speed of the inputs may be normalized. For instance, some girders may be created faster than some others when initially recorded. However, a normalization procedure may be used to make sure that they are created and snapped down at a common and consistent rate. Similar comments apply with respect to normalizing other "touch down" events involved in, for example, girder removal, pipe traversal, etc. For instance, the playback speed of events may be normalized such that movements or activities occur within singular, or across multiple, guide actions at a predetermined rate that may, for example, be expressed in terms of amount of travel per frame, amount of travel per second or fraction thereof, absolute time for a particular action (e.g., touch down action), etc.

By making these and/or other modifications to the recorded input, certain exemplary embodiments are able to provide a more robotic or mechanical look-and-feel for the game rather than simply playing back pre-recorded inputs. This may, on the whole, make it seem less like a human is giving guidance and more like the game itself is giving guidance.

The data corresponding to the recorded and modified inputs may be compressed in step S2114. In certain exemplary embodiments, the data itself may correspond to a compressed animation, video, series of image files, etc., to be overlaid on the game screen. In certain exemplary embodiments, the data may be stored in a table, linked list, or other data structure, e.g., with control codes and associated data. The control codes may be, for example, start a particular player character, navigate a virtual landscape, attack enemies, solve a puzzle, find treasure, remove a girder with a corresponding girder location, place a girder with corresponding start and end locations, add a ladder with corresponding start/end locations, place a pipe at location, traverse a particular pipe, etc. In certain exemplary embodiments, easily compressible vectors may be stored, e.g., for girder removal, girder placement, etc. The stylus or cursor image may be added and stored with this compressed data, added during game play (e.g., substantially in real-time), etc.

A compressed data structure or data structures is/are generated for storage on the media to be distributed with the game (e.g., a game ROM or other storage device) in step S2116. The compressed data structure or data structures is/are stored to the media in step S2118.

Figure 23A:
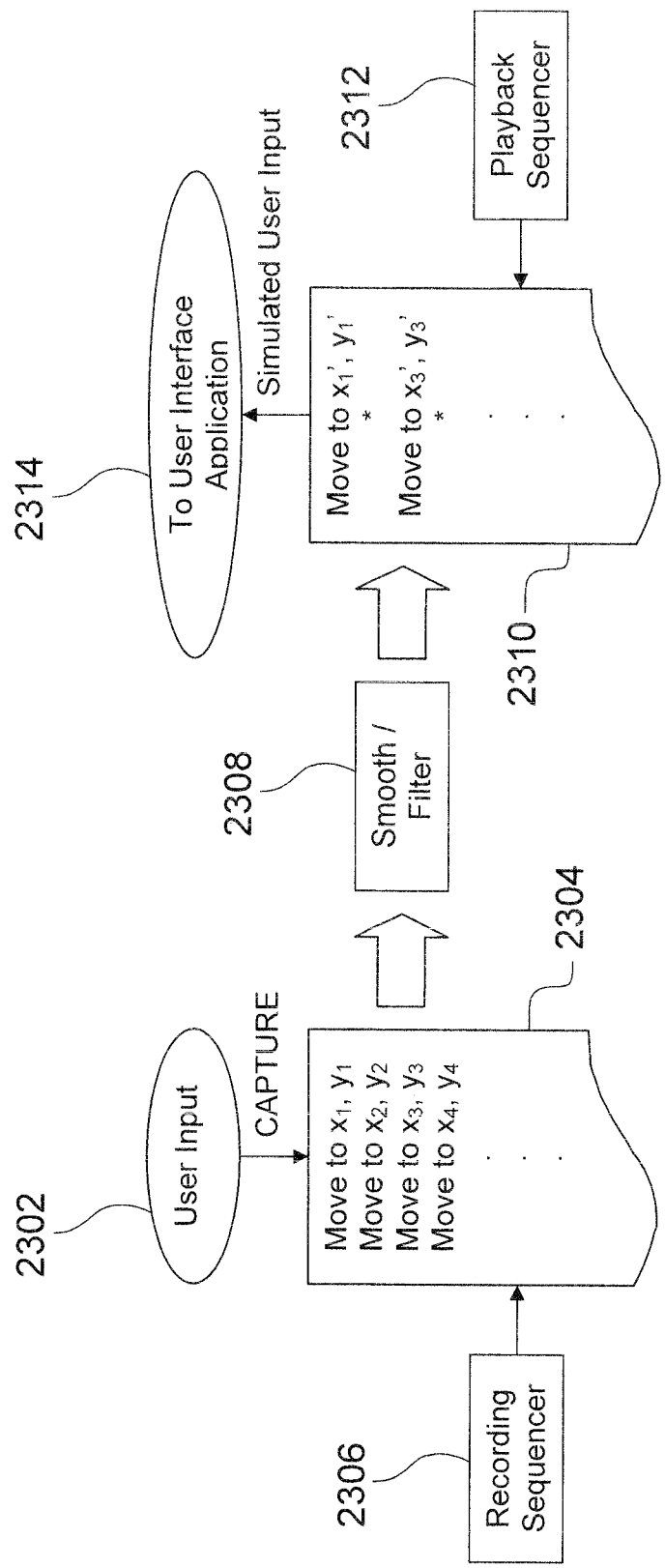
FIG. 23A shows an example recording and playback process in accordance with certain exemplary embodiments.

FIG. 23A shows an example recording and playback process in accordance with certain exemplary embodiments. User input 2302 may be captured into a user interface event file 2304 with the aid of a recording sequencer 2306. The recording sequencer may help, for example, setup the user interface event file 2304, control the rate at which data is to be captured (e.g., capture a location on the screen every X frames or second, etc.), associate a timestamp with the captured input, etc. In certain exemplary embodiments, the recording sequencer 2306 may also help to specify the action(s) or event for which the user input is being captured. The interface event file 2304 may be stored to a non-transitory computer-readable storage medium and may include, for example, a series of coordinates with associated timestamps, vectors, button bushes, and/or the like. In the FIG. 23A example, movements from the $(x_1, y_1)$ virtual position to the $(x_4, y_4)$ virtual position through two intermediate virtual positions are recorded. Although two dimensional coordinates are described, it will be appreciated that other coordinate systems may be used. It also will be appreciated that different types of inputs may be captured and/or represented in different ways. For example, movements may be stored as vectors, button pushes may be stored along with an indication of how long the button push is to take place, etc. Modifications to the event data may be made by suitably configured programmed logic circuitry 2308 so as to, for example, smooth, filter, normalize, and/or otherwise process the recorded input. The output of this modification programmed logic circuitry 2308 may be, for example, a compressed smoothed user interface event file 2310. As shown in the FIG. 23A example, corrections to the virtual locations $(x_1, y_1)$ and $(x_3, y_3)$ are made such that the compressed smoothed user interface event file 2310 includes movements to slightly different virtual locations $(x_1', y_1')$ and $(x_3', y_3')$. In addition, it is determined that the movements to $(x_2, y_2)$ and $(x_4, y_4)$ are unnecessary (e.g., because they were incorrect movements, removed by virtue of a compression algorithm, smoothed out as a result of a smoothing algorithm, etc.). The playback sequencer 2312 may help to replay the recorded input as modified so as to simulate user input for the user by the user interface application 2314, e.g., by synchronizing movements, changing time, performing optional additional smoothing and/or consistency processing (with or without the aid of the modification programmed logic circuitry 2308 or the like), etc.

It is noted that multiple user interface event files and/or multiple compressed smoothed user event files may be provided as corresponding to multiple different actions in certain exemplary embodiments. Also, although certain exemplary embodiments have been described in relation to captured inputs, it will be appreciated that certain exemplary embodiments may use in addition or in the alternative simulated user inputs or custom or scripted animation sequences that are somewhat more video-like in nature that may have been created by a developer, designer, or other person.

Figure 24:
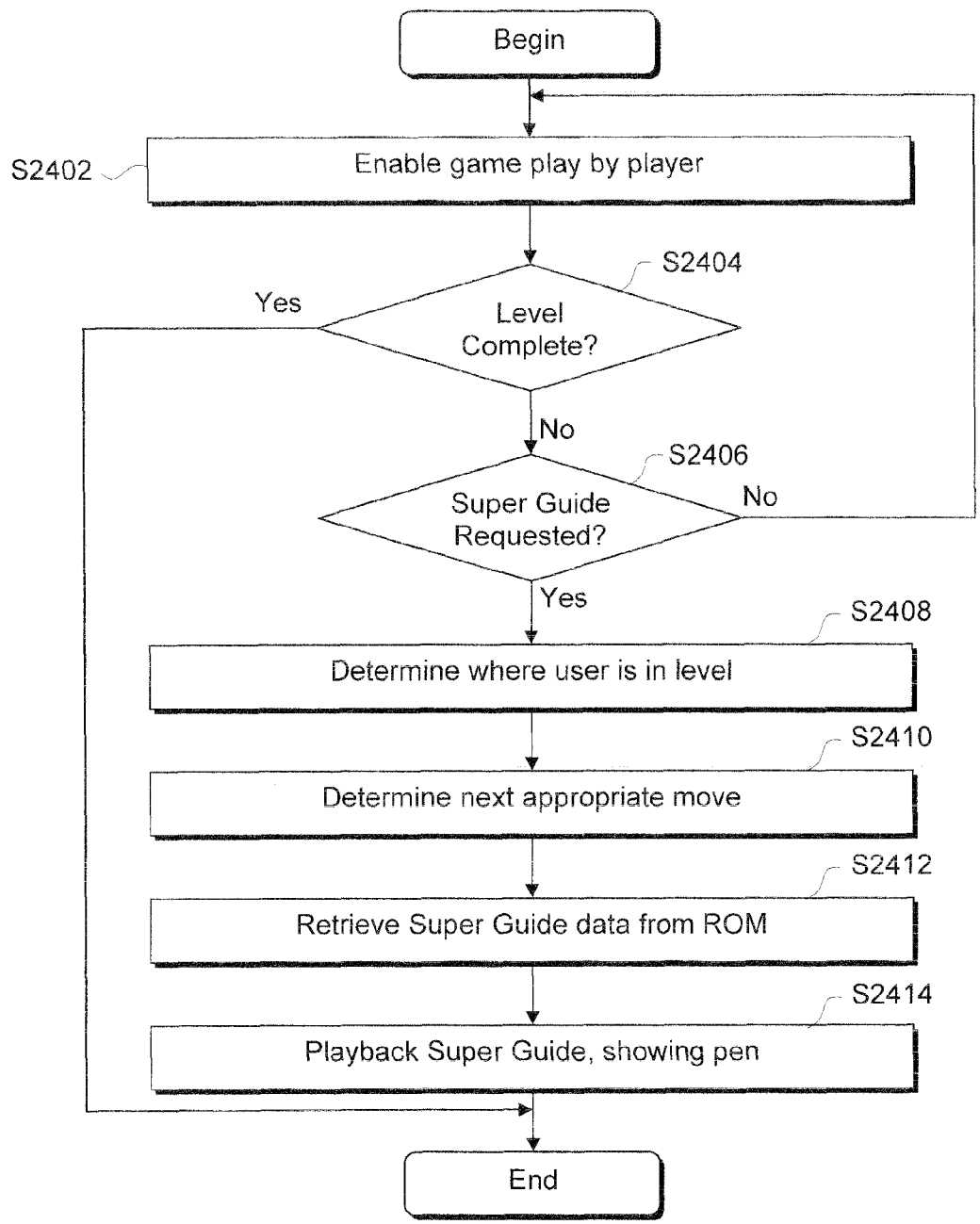
FIG. 24 is a flowchart showing an illustrative process for using an improved Super Guide in accordance with an exemplary embodiment.

FIG. 24 is a flowchart showing an illustrative process for using an improved Super Guide in accordance with an exemplary embodiment. In step S2402, game play is enabled for the user, e.g., on a suitable device using a suitable input mechanism (such as, for example, one of the above-described and/or other pointing devices). A determination is made as to whether the level is complete in step S2404. If it is, the process is ended. If it is not, however, a determination is made as to whether the Super Guide is requested or needed in step S2406. If the Super Guide not requested, the game play goes on and the process returns to step S2402.

If, however, the Super Guide is requested, a determination is made as to where the user is in the level in step S2408. The next appropriate move is determined in step S2410. As alluded to above, this determination may be based on the best available move, the easiest move to make, the move that will take the player closest to the ultimate end goal, the move that will earn the player the most points, etc.

The appropriate data is retrieved (e.g., from the game ROM) in step S2412. The Super Guide help is played back in step S2414, with the input device (e.g., stylus, etc.) displayed on the screen in the appropriate location(s). In certain exemplary embodiments, the stylus icon and/or pointer indicator may be added, as appropriate. For example, a stylus (or other input device) icon may be added in a right-handed or left-handed orientation, for example, as set by the player, as inferred by the game system (e.g., from contact angle, accelerometer data, and/or the like), etc. Any decompression may be performed, as necessary, when the data is being retrieved, as the help is being played back, etc., in different embodiments of this invention. In certain exemplary embodiments, the Super Guide help may be displayed as the game is progressing (e.g., as the action continues to take place), as the game is paused, after the player has failed to achieve an objective a certain number of times, etc.

In certain exemplary embodiments, the designer may set the playback speed. In addition, or in the alternative, this value for playback speed may be player-adjustable in certain exemplary embodiments.

As explained in detail above in connection with FIG. 21, for example, the modifications to the recorded inputs (including any smoothing and/or any other corrections, etc.) may be performed prior to storage of the data on the non-transitory game carrier medium. However, in certain exemplary embodiments, some or all of the modifications may be made when the Super Guide is requested (e.g., in substantially real-time during game play). For instance, in certain exemplary embodiments, smoothing may be performed at design time, whereas playback speed normalization and/or other delays may be performed at runtime.

Although certain exemplary embodiments have been described as relating to puzzle or strategy games and certain example actions therein, it will be appreciated that the techniques described herein may be applied with respect to other types of games. For example, Super Guide help may help explain how to negotiate a potentially complicated game map in the context of a puzzle or strategy game, where and/or how to attack an enemy character in the context of an action game, etc. Thus, the techniques described herein are not limited to the illustrative game, game type, actions, or action types identified above. In addition to providing help for games, the exemplary techniques described herein may be applied to other types of applications that involve human-computer interactions including, for example, word processing applications, Internet applications, graphics packages, audio and/or video editing packages, etc. The ability to provide help and make it look less organic and more mechanical thus can be applied to a wide variety of example implementations.

Providing less organic and more consistent, mechanical, and automatic simulations may be advantageous in certain exemplary embodiments, as users have certain expectations when guidance is provided by a live human that differ from when guidance is provided from a machine, without narration, etc. For instance, allowances for mistakes, miscues, jittery or imprecise movements, inconsistent similar activities, etc., may be made when a human is providing guidance with or without live feedback. The same allowances, however, typically are not made when a user is receiving pre-recorded or "canned" feedback. Instead, the user may expect the user interface to be very mechanical, automatic, and consistent in its movements, as the human user is unable to directly interact, interrupt, and ask questions of the pre-recorded guidance. Certain exemplary embodiments therefore are capable of advantageously creating consistent, mechanical, and automatic feeling guidance that may be tolerated by users even though it may be recorded from live inputs that are subject to the organic movements and inconstancies that otherwise might be unacceptable to the user receiving the guidance.

Although certain exemplary embodiments have been described in connection with pointer-based input devices (such as, for example, stylus, pen, cursor, Wii remote, and/or other devices), the techniques described herein may be used in connection with input recorded from and/or to be provided by a user using other types of input devices. For example, the smoothing-out and/or otherwise making more mechanical and consistent looking techniques of certain exemplary embodiments may be applied to input devices including cross-switches, joysticks, buttons, and/or the like.

The Super Guide and the main or underlying game or application may be displayed on a common display screen or on separate display screens in different exemplary embodiments. For instance, in multiplayer games (e.g., where users compete with one another), one user may request a Super Guide that may then be displayed on a display device of or for the user that is not shared with and/or visible by another user. In certain exemplary instances, the Super Guide may be shown on a handheld display or controller of a first user while two or more users play a game that is competitive or collaborative in nature on a separate, common display. In this way, users may not "free ride" on other users who invoke a Super Guide. This may be advantageous in competitive style games, games where the use of Super Guides may be limited to a certain number of earned uses or subject to a "fee" of a certain number of credits, points, or other limited objects redeemable for such uses, etc. Of course, in other exemplary scenarios, when one user requests a Super Guide, it may be displayed to all users on a common screen or on shared screens of the various users.

While the systems and methods have been described in connection with what is presently considered to practical and preferred embodiments, it is to be understood that these systems and methods are not limited to the disclosed embodiments, but on the contrary, is intended to cover various modifications and equivalent arrangements included within the scope of the appended claims.

It will be appreciated that the Super Guides of certain exemplary embodiments may be displayed once and optionally replayed one or more times. The user may be asked or required to follow or otherwise mimic the simulated input before the game or application is returned to a normal mode of operation in certain scenarios. This may help ensure that the user understands and is perhaps able to provide the suggested input before being allowed to proceed.

What is claimed is:

1. A non-transitory computer readable storage medium tangibly storing instructions that are executable by a processor, at least to:

enable a user to play a game by running a game program;
receive a request for help from the user from within the game program;
determine a current state of the game program;
determine a next appropriate action for the user based on the current state and the request for help; and
cause an annotated display of the next appropriate action for the user to guide the user in accordance with the request for help to be provided, wherein the annotated display is generated from pre-recorded input and/or series of inputs selected from a catalog of pre-recorded inputs and/or series of inputs based on the next appropriate action for the user,
wherein the annotated display includes an added representation of an operating device and how it may be manipulated to provide an indication of the next appropriate action to guide the user in accordance with the request for help, wherein manipulations of the operating device displayed in the annotated display (a) are inconsistent with reproduction based on the selected pre-recorded input and/or series of inputs alone, and (b) instead reflect a modified version of the selected pre-recorded input and/or series of inputs.

2. The non-transitory computer readable storage medium of claim 1, wherein the modified version reflects one or more of:
   a prolongation of at least one manipulation of the operating device relative to a portion of the pre-recorded input and/or series of inputs so that the added representation of the operating device is visible in the annotated display for at least a predetermined amount of time;
   a smoothing and/or filtering of at least a portion of the pre-recorded input and/or series of inputs so that the corresponding annotated display includes an object lacking jitters that otherwise would be present;
   a removal of at least a portion of the pre-recorded input and/or series of inputs so that the corresponding annotated display includes an object proceeding more directly from a start point to an end point; and
   a normalization of at least a portion of the pre-recorded input and/or series of inputs so that the corresponding annotated display includes an object proceeding at a predetermined pace and/or within a predetermined amount of time.

3. The non-transitory computer readable storage medium of claim 2, wherein modifications to the pre-recorded input and/or series of inputs are processed and stored ahead of time so that annotated displays are retrievable from a storage location.

4. The non-transitory computer readable storage medium of claim 2, wherein modifications to the pre-recorded input and/or series of inputs are processed upon requests for help.

5. The non-transitory computer readable storage medium of claim 1, wherein the game program is at least temporarily paused during the annotated display.

6. The non-transitory computer readable storage medium of claim 1, wherein the game program is output to a first display device and the annotated display is output to a second display device.

7. The non-transitory computer readable storage medium of claim 1, wherein the modified version of the selected pre-recorded input and/or series of inputs involves a prolongation of at least one manipulation of the operating device relative to a portion of the selected pre-recorded input and/or series of inputs so that the added representation of the operating device is visible in the annotated display for at least a predetermined amount of time.

8. The non-transitory computer readable storage medium of claim 1, wherein the modified version of the selected pre-recorded input and/or series of inputs involves a smoothing and/or filtering of at least a portion of the selected pre-recorded input and/or series of inputs so that the corresponding annotated display includes an object lacking jitters that otherwise would be present.

9. The non-transitory computer readable storage medium of claim 1, wherein the modified version of the selected pre-recorded input and/or series of inputs involves a removal of at least a portion of the selected pre-recorded input and/or series of inputs so that the corresponding annotated display includes an object proceeding more directly from a start point to an end point, the object being the added representation of the operating device and/or a player character.

10. The non-transitory computer readable storage medium of claim 1, wherein the modified version of the selected pre-recorded input and/or series of inputs involves a normalization of at least a portion of the selected pre-recorded input and/or series of inputs so that the corresponding annotated display includes an object proceeding at either a predetermined pace or within a predetermined amount of time.

11. The non-transitory computer readable storage medium of claim 1, wherein the added representation represents one or more objects physically manipulable in the real world for providing input to the game.

12. The non-transitory computer readable storage medium of claim 11, wherein the annotated display is output to a display device.

13. The non-transitory computer readable storage medium of claim 12, wherein the display device is a touch screen display device.

14. The non-transitory computer readable storage medium of claim 13, wherein the operating device is a stylus or pen.

15. The non-transitory computer readable storage medium of claim 14, wherein the pre-recorded input and/or series of inputs is modified to account for a lack of resolution of the touch screen display device.

16. The non-transitory computer readable storage medium of claim 14, wherein the pre-recorded input and/or series of inputs is modified to adjust recorded stylus or pen touch-down events so that subsequently displayed representations of touch-down events last for a uniform, predetermined amount of time.

17. The non-transitory computer readable storage medium of claim 13, wherein the operating device is a human finger.

18. The non-transitory computer readable storage medium of claim 17, wherein the pre-recorded input and/or series of inputs is modified to account for a lack of resolution of the touch screen display device.

19. The non-transitory computer readable storage medium of claim 18, wherein the pre-recorded input and/or series of inputs is modified to adjust recorded finger touch-down events so that subsequently displayed representations of touch-down events last for a uniform, predetermined amount of time.

20. The non-transitory computer readable storage medium of claim 18, wherein the pre-recorded input and/or series of inputs is modified to adjust placements of recorded finger touch-down events so as to consistently align these placements with respect to corresponding displayed game objects.

21. A non-transitory computer readable storage medium tangibly storing instructions that are executable by a processor, at least to:
   enable a user to play a game by running a game program;
   receive a request for help from the user from within the game program;
   determine a current state of the game program;
   determine a next appropriate action for the user based on the current state and the request for help; and
   cause an annotated display to be generated based on modified pre-recorded input and/or series of inputs, selected from a catalog of pre-recorded inputs and/or series of inputs, based on the next appropriate action for the user, to guide the user in accordance with the request for help,
   wherein the annotated display includes an added representation of an operating device and how it may be manipulated to guide the user in accordance with the request for help,
   wherein the modified pre-recorded input and/or series of inputs involves a line drawn as a part of the pre-recorded input and/or series of inputs adjusted so as to snap to a grid having cells that are one or more pixels in each dimension such that a straighter line and/or segment of line is/are provided and that otherwise would not be provided if the pre-recorded input and/or series of inputs were simply replayed.

22. A method of guiding a user of an application program running on a computer system, the method comprising:
   enabling the user to use the application program on the computer system;
   receiving a request for help from the user from within the application program and while the user is using the application program;
   determining, via a processor of the computer system, an appropriate next action or next series of actions based on the request for help; and
   responsive to the request for help from the user, temporarily interrupting the user's use of the application program and visually demonstrating to the user how to take the appropriate next action or next series of actions by playing back a suggestion of input and/or series of inputs to simulate the appropriate next action or next series of actions to be taken, the suggestion being generated from pre-stored input and/or series of inputs that has/have been captured and subsequently modified in making the suggestion,
   wherein the appropriate next action or next series of actions to be taken is simulated using one or more visual cues demonstrating how the user is to use a physical input device in connection with a user interface of the application program, the one or more visual cues being generated based on data that differs from the pre-stored input and/or series of inputs that has/have been captured by virtue of the subsequent modification; and
   wherein the suggestion of input and/or series of inputs is based on data that differs from the pre-stored input and/or series of inputs that has/have been captured by virtue of the subsequent modification, the subsequent modification including one or more of:
      a prolongation so that the corresponding simulation is visible for at least a predetermined amount of time;
      a smoothing and/or filtering so that the corresponding simulation lacks jitters that otherwise would be present therein if the pre-recorded input and/or series of inputs were reproduced without the subsequent modification;
      an aspect of the corresponding simulation proceeding more directly from a start point to an end point than otherwise would occur if the pre-recorded input and/or series of inputs were reproduced without the subsequent modification; and
      an aspect of the corresponding simulation proceeding at a predetermined, normalized pace.

23. The method of claim 22, further comprising determining a current state of the application program, the current state being considered in the determining of the appropriate next action or next series of actions.

24. The method of claim 22, further comprising modifying the pre-stored input and/or series of inputs as the application program is being executed by the user.

25. A method of guiding a user of an application program running on a computer system, the method comprising:
   enabling the user to use the application program on the computer system;
   receiving a request for help from the user from within the application program and while the user is using the application program;
   determining, via a processor of the computer system, a next course of action appropriate for the request for help and a current state of the application program; and
   responsive to the request for help from the user, temporarily interrupting the user's use of the application program and visually demonstrating to the user how to take the next course of action by playing back pre-recorded and pre-modified data to simulate the next course of action, the pre-recorded and pre-modified data being generated from input and/or series of inputs that has/have (a) been captured while a human uses the application program and, once captured, (b) then stored to a storage location and modified prior to the visual demonstration,
   wherein the next course of action is simulated using one or more visual cues demonstrating how the user is to use a physical input device in connection with a user interface of the application program, the one or more visual cues being generated based on data that differs from the pre-recorded data, by virtue of the pre-modification; and
   wherein the next course of action is based on data that differs from the pre-recorded data by virtue of the pre-modification, the pre-modification including one or more of:
      a prolongation so that the corresponding simulation is visible for at least a predetermined amount of time;
      a smoothing and/or filtering so that the corresponding simulation lacks jitters that otherwise would be present therein if the pre-recorded data were reproduced without the pre-modification;
      an aspect of the corresponding simulation proceeding more directly from a start point to an end point than otherwise would occur if the pre-recorded data were reproduced without the pre-modification; and
      an aspect of the corresponding simulation proceeding at a predetermined, normalized pace.

26. A computerized system, comprising:
   a memory; and
   a processor configured to execute a game program on the computerized system, the game program being programmed to:
      receive a request for help from a user,
      determine, via the processor, an appropriate next action or next series of actions based on the request for help, and
      cause a visual suggestion to be displayed to the user regarding how to use one or more physical input mediums to supply to the game program the appropriate next action or next series of actions, the visual suggestion including the playing back of modified pre-provided input and/or series of inputs corresponding to the appropriate next action or next series of actions, the visual suggestion including an annotation that includes an added representation of an operating device and how it may be manipulated to provide the appropriate next action or next series of actions to guide the user in accordance with the request for help, manipulations of the added representation of the operating device in the visual suggestion being inconsistent with (a) an unmodified version of the pre-provided input and/or series of inputs and (b) idiosyncratic actions likely to be taken in connection with a user's subsequent attempt to perform the next appropriate next action or next series of actions via the operating device.

27. The system of claim 26, further comprising a non-transitory storage location tangibly storing the visual suggestion.

28. The system of claim 27, wherein annotations and/or modifications to the pre-provided input and/or series of inputs are processed and stored in the storage location ahead of time so that visual suggestions are retrievable during game program execution by the user.

29. The system of claim 26, wherein the game program is further programmed to modify the pre-provided input and/or series of inputs at runtime.

30. The system of claim 26, wherein the game program is further programmed to at least temporarily pause the game program during the visual suggestion.

31. The system of claim 26, further comprising a first display device and at least one second display device,
wherein normal operation of the game program is output to the first display device and the visual suggestion is output to the at least one second display device.

32. The system of claim 26, further comprising:
a console gaming system;
a first display device connected to the console gaming system on which a common screen of the game program is displayable; and
a plurality of input devices, each said input device being usable by a different user and including a second display device on which an individualized user screen of the game program is displayable.

33. The system of claim 32, wherein a visual suggestion is displayable only on a second display device of the user requesting help.

34. The system of claim 26, wherein the game program is further programmed to overlay the visual suggestion on a main game screen.

35. The system of claim 26, wherein the pre-provided input and/or series of inputs is/are pre-recorded.

36. The system of claim 26, wherein the pre-provided input and/or series of inputs is/are simulated.

* * * * *